US012082195B2

(12) United States Patent
Futaki et al.

(10) Patent No.: US 12,082,195 B2
(45) **Date of Patent: *Sep. 3, 2024**

(54) RADIO COMMUNICATION SYSTEM, RADIO STATION, RADIO TERMINAL, COMMUNICATION CONTROL METHOD, AND NON-TRANSITORY COMPUTER READABLE MEDIUM

(71) Applicant: NEC Corporation, Tokyo (JP)

(72) Inventors: Hisashi Futaki, Tokyo (JP); Hiroaki Aminaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/750,545

(22) Filed: May 23, 2022

(65) Prior Publication Data

US 2022/0287023 A1 Sep. 8, 2022

Related U.S. Application Data

(63) Continuation of application No. 16/708,738, filed on Dec. 10, 2019, now Pat. No. 11,343,803, which is a (Continued)

(30) Foreign Application Priority Data

Feb. 22, 2013 (JP) ................................. 2013-033704

(51) Int. Cl.
*H04W 72/20* (2023.01)
*H04L 5/00* (2006.01)
(Continued)

(52) U.S. Cl.
CPC ........... *H04W 72/20* (2023.01); *H04L 5/0098* (2013.01); *H04W 72/04* (2013.01); *H04W 76/15* (2018.02); *H04L 5/001* (2013.01); *H04L 5/0085* (2013.01)

(58) Field of Classification Search
None
See application file for complete search history.

(56) References Cited

U.S. PATENT DOCUMENTS

2011/0300856 A1 12/2011 Aminaks
2012/0309292 A1 12/2012 Sawai
(Continued)

FOREIGN PATENT DOCUMENTS

CN 102870450 A 1/2013
EP 2675213 A1 12/2013
(Continued)

OTHER PUBLICATIONS

3GPP TS 36.300 V11.3.0, "Evolved Universal Terrestrial Radio Access(E-UTRA) and Evolved Universal Terrestrial Radio Acces Network (E-UTRAN): Overall description: Stage 2 (Release 11)." Section 7.5. Sep. 2012, p. 3, 205 pp.
(Continued)

*Primary Examiner* — Rebecca E Song

(57) ABSTRACT

A radio terminal can perform carrier aggregation using a first cell of a first radio station and a second cell of a second radio station. The first radio station performs, with the radio terminal, radio resource control for the first cell and the second cell in order to perform the carrier aggregation. Further, the first radio station transmits, to the second radio station, update information regarding an update to a configuration related to the radio resource control for the second cell. It is thus, for example, possible to prevent or reduce data transmission/reception failures which would otherwise occur while a configuration of radio parameters or the like is being changed by a radio terminal in carrier aggregation of a plurality of cells served by different radio stations.

6 Claims, 11 Drawing Sheets

Related U.S. Application Data continuation of application No. 15/844,126, filed on Dec. 15, 2017, now Pat. No. 10,536,930, which is a continuation of application No. 14/766,010, filed as application No. PCT/JP2014/000454 on Jan. 29, 2014, now Pat. No. 9,961,672.

(51) Int. Cl.
*H04W 72/04* (2023.01)
*H04W 76/15* (2018.01)

(56) References Cited

U.S. PATENT DOCUMENTS

| | | | | |
|---|---|---|---|---|
| 2013/0028069 | A1 | 1/2013 | Pelletier et al. | |
| 2013/0039287 | A1 | 2/2013 | Rayaysrapu et al. | |
| 2013/0058234 | A1 | 3/2013 | Yang | H04W 72/0446 370/252 |
| 2013/0114574 | A1 | 5/2013 | Ng et al. | |
| 2013/0303179 | A1 | 11/2013 | Jitsukawa et al. | |
| 2013/0322389 | A1 | 12/2013 | Maeda et al. | |
| 2014/0010086 | A1 | 1/2014 | Etemad et al. | |
| 2014/0023016 | A1 | 1/2014 | Mildh et al. | |
| 2014/0192671 | A1* | 7/2014 | Lim | H04W 24/08 370/252 |
| 2015/0003418 | A1 | 1/2015 | Rosa et al. | |
| 2015/0098322 | A1 | 4/2015 | Chen | |
| 2015/0237514 | A1 | 8/2015 | Maeda et al. | |
| 2015/0319801 | A1* | 11/2015 | Lee | H04W 74/0833 370/329 |
| 2015/0358960 | A1* | 12/2015 | Zhang | H04W 52/146 455/450 |
| 2015/0373559 | A1 | 12/2015 | Hong | H04W 52/0206 370/329 |
| 2017/0272364 | A1* | 9/2017 | Ishii | H04W 76/15 |

FOREIGN PATENT DOCUMENTS

| | | | |
|---|---|---|---|
| JP | 2009-111641 | A | 5/2009 |
| JP | 2011-205369 | A | 10/2011 |
| RU | 2011127204 | A | 1/2013 |
| WO | WO-2011/155258-41 | | 12/2011 |
| WO | WO-2012/101686 | A1 | 8/2012 |
| WO | WO-2012/107986 | A1 | 8/2012 |
| WO | WO-2012/108399 | A1 | 8/2012 |
| WO | WO-2012/109195 | A2 | 8/2012 |
| WO | WO-2012/134567 | A1 | 10/2012 |
| WO | WO-2012/136256 | A1 | 10/2012 |
| WO | WO-2012/147863 | A1 | 11/2012 |
| WO | WO-2012/168996 | A1 | 12/2012 |
| WO | WO-2013/010418 | A1 | 1/2013 |
| WO | WO-2013/023353 | A1 | 2/2013 |

OTHER PUBLICATIONS

3GPP TS 36.300 V11.3.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11). 205 pages (2012.

3GPP TS 36.331 V11.2.0, "Evolved Universal Terrestrial Radio Access (E-UTRA): Radio Resource Control (RRC); Protocol Specification (Release 11)," Section 5.3.5.3, Dec. 2012, p. 3, 340 pp.

3GPP TS 36.331 V11.2.0, 3rd Generation Partnership Project; Technical Specification Group Radio Access Network: Evolved Universal Terrestrial Radio Access (E-UTRA): Radio Resource Control (RRC): Protocol Specification (Release 11). 340 pages (2012).

3GPP TSG RAN Workshop on Rel-12 and Onwards, RWS-120046, 11-12, Jun. 2012, 5 pp.

Chinese The First Office Action issued in Chinese Patent Application No. 201480010174.4, dated Feb. 6, 2018. 29 pages.

Extended European Search Report issued for European Patent Application No. 14754386.2 on Sep. 2, 2016 (8 pages).

Extended European Search Report Issued in European Patent Application No. 19169089.0, dated Jul. 25, 2019, 10 pages.

Fujitsu, "Discussion of Issues in Small Cell Deployments", 3GPP TSG-RAN WG2 Meeting #81, R2-130513, St. Julian's, Malta. Jan. 28-Feb. 1, 2013, pp. 1-5 (5 pages).

Intel Corporation, R2-130572, "Discussion on Minimizing UE Context Transfer and Signalling to CN," 3GPP TSG-RAN2 Meeting #81, St. Julian's, Malta, 5 pages (Jan. 28, 2013-Feb. 1, 2013).

International Search Report for International Patent Application No. PCT/JP2014/000454 mailed Feb. 25, 2014 (2 pages).

Japanese Notice of Reasons for Refusal issued in Japanese Patent Application No. 2018-176209, dated Jun. 25, 2019, 6 pages.

Japanese Notification of Reasons for Refusal issued in Japanese Patent Application No. 2015-501309, dated Jan. 23, 2018, 7 pages.

Japanese Office Action issued by the Japan Patent Office for Japanese Application No. 2015-501309 dated Oct. 3, 2017 (7 pages).

NEC "Consideration of the Possible Structures on the Dual Connectivity", 3GPP TSG-RAN WG2 Meeting #81, R2-130268, St. Julian's, Malta, Jan. 28-Feb. 1, 2013, pp. 1-5 (5 Sheets).

Nokia Corporation, Nokia Siemens Networks "Discussion on Small Cells Dual Connectivity", 3GPP TSG-RAN WG2 Meeting #81, R2-130453, Malta, Jan. 28-Feb. 1, 2014, pp. 1-4 (4 Sheets).

Notification of Reasons for Refusal issued for Japanese Patent Application No. 2015-501309 on Sep. 28, 2017 (7 pages).

NTT DOCOMO, INC., "Requirements, Candidate Solutions & Technology Roadmap for LTE Rel-12 Onward." 3GPP Workshop on Release 12 and onwards, RWS-120010, Ljubljana, Slovenia, 27 pages (Jun. 11-12, 2012).

Renesas Mobile Europe, "Discussion about RRM and Mobility for Small Cell Scenario", 3GPP TSG-RAN WG2 #81, R2-130658, Malta, Jan. 28-Feb. 1, 2013, 5 pages.

Russian Official Action issued for Russian Patent Application No. 2016135366 on Sep. 21, 2016 (11 pages).

Samsung, "Technologies for Rel-12 and Onwards," 3GPP TSG RAN Workshop on Rel-12 and Onwards, Ljubijana, Slovenia, 32 pages (Jun. 11-12, 2012).

Japanese Office Action for JP Application No. 2020-006824 mailed on Jan. 6, 2021 with English Translation.

NTT DOCOMO, INC., "Necessity of C-plane architecture enhancements for dual connectivity", 3GPP TSG-RAN WG2#61 R2-130488, Feb. 1, 2013, pp. 1-4, Malta.

* cited by examiner

RADIO COMMUNICATION SYSTEM, RADIO STATION, RADIO TERMINAL, COMMUNICATION CONTROL METHOD, AND NON-TRANSITORY COMPUTER READABLE MEDIUM

CROSS-REFERENCE TO RELATED APPLICATIONS

The present application is a Continuation application of U.S. patent application Ser. No. 16/708,738 filed on Dec. 10, 2019, which is a Continuation application of U.S. patent application Ser. No. 15/844,126 filed on Dec. 15, 2017, which is issued as U.S. Pat. No. 10,536,930, which is a Continuation application of U.S. patent application Ser. No. 14/766,010 filed on Aug. 5, 2015, which is issued as U.S. Pat. No. 9,961,672, which is a National Stage Entry of international application PCT/JP2014/000454 filed on Jan. 29, 2014, which claims the benefit of priority from Japanese Patent Application 2013-033704 filed on Feb. 22, 2013, the disclosures of all of which are incorporated in their entirety by reference herein.

TECHNICAL FIELD

The present invention relates to a radio communication system in which a radio station communicates with a radio terminal by using a plurality of cells.

BACKGROUND ART

In order to improve the deterioration of communication quality due to drastic increases in mobile traffic in recent years and achieve faster communication, the standardization of Carrier Aggregation (CA) functions that enable a radio terminal (User Equipment (UE)) to communicate with a radio base station (eNode B (eNB)) by using a plurality of cells has been undertaken in the 3GPP Long Term Evolution (LTE). Note that the cells that a UE (User Equipment) can use in CA are limited to a plurality of cells of one eNB (i.e., a plurality of cells served by one eNB).

The cells that are used by a UE in CA are categorized into a Primary Cell (PCell) that has already been used as a serving cell when the CA is started and a Secondary Cell(s) (SCell(s)) that is used in addition to the PCell or in dependence thereon. Each SCell can be used by a UE as the need arises, and the use of them can be stopped. Note that starting the use of an SCell is called “activating” or “activation”. Similarly, stopping the use of an SCell is called “deactivating” or “deactivation”. Non-Access Stratum (NAS) mobility information, security information (security input) and the like are transmitted and received through a PCell during radio connection (re)-establishment (RRC connection Establishment/Re-establishment) (see Non-patent Literature 1). A downlink (DL) Carrier and an uplink (UL) Carrier corresponding to a PCell are called “DL Primary Component Carrier (PCC)” and “UL PCC”, respectively. Similarly, a DL Carrier and a UL Carrier corresponding to a SCell are called “DL Secondary Component Carrier (SCC)” and “UL SCC”, respectively.

An operation that is performed to change a radio resource configuration (i.e., RRC information) in an SCell when downlink data (DL data) is transmitted/received in CA is explained with reference to FIG. 11 (Non-patent Literature 2). Here, it is assumed that a UE uses a first cell (Cell1) and a second cell (Cell2) served by an eNB as a PCell and an SCell, respectively. In a step S1, the eNB transmits, to the UE, configuration information for the SCell (i.e., the Cell2) (RRC Connection Reconfiguration (SCell configuration)). In a step S2, the UE performs configuration of radio parameters and the like for the SCell (i.e., the Cell2) (SCell configuration). In a step S3, the UE reports the completion of the configuration of the SCell to the eNB (RRC Connection Reconfiguration Complete).

In a step S4, the eNB transmits to the UE an instruction about the start of the use (called “Activation”) of the SCell (Activation control element (activation of SCell)). In a step S5, the UE starts to use the SCell (SCell activation). In steps S6 and S7, the eNB transmits DL data to the UE by using the PCell or the SCell, or both of them.

In a step S8, the eNB determines that it needs to change the radio resource configuration of the SCell (i.e., the Cell2) and hence transmits to the UE the configuration information related to the SCell that should be changed (RRC Connection Reconfiguration (SCell modification)). In a step S9, the UE updates the configuration of the SCell (SCell modification). In a step S10, the UE reports, to the eNB, the completion of the configuration change of the SCell (RRC Connection Reconfiguration Complete). Note that the eNB does not transmit DL data to the UE in the SCell (i.e., the Cell2) until the eNB receives the report of configuration change completion from the UE.

In steps S11 and S12, the eNB transmits DL data to the UE by using the PCell or the SCell, or both of them.

A radio resource configuration of the SCell in the CA can be appropriately changed through the procedure shown in FIG. 11. Note that data transmission/reception is suspended while the eNB and the UE is configuring or updating radio parameters and the like by the RRC Connection Reconfiguration. For example, the eNB suspends DL data transmission to the UE and the UE suspends the DL data reception from the eNB.

CITATION LIST

Non Patent Literature

Non-patent Literature 1: 3GPP TS 36.300 V11.3.0, “Evolved Universal Terrestrial Radio Access (E-UTRA) and Evolved Universal Terrestrial Radio Access Network (E-UTRAN); Overall description; Stage 2 (Release 11)”, Section 7.5, September 2012

Non-patent Literature 2: 3GPP TS 36.331 V11.2.0, “Evolved Universal Terrestrial Radio Access (E-UTRA); Radio Resource Control (RRC); Protocol specification (Release 11)”, Section 5.3.5.3, December 2012

Non-patent Literature 3: 3GPP RWS-120046, Samsung Electronics, “Technologies for Rel-12 and Onwards”, 3GPP TSG RAN Workshop on Rel-12 and Onwards, Ljubljana, Slovenia, 11-12 Jun. 2012

Non-patent Literature 4: 3GPP RWS-120010, NTT DOCOMO, “Requirements, Candidate Solutions & Technology Roadmap for LTE Rel-12 Onward”, 3GPP TSG RAN Workshop on Rel-12 and Onwards, Ljubljana, Slovenia, 11-12 Jun. 2012

SUMMARY OF INVENTION

Technical Problem

Further, inter-base station carrier aggregation (inter-eNB CA) in which cells of different radio base stations (eNBs) are simultaneously used has been proposed (Non-patent Literatures 3 and 4). For example, a cell of a macro base station (Macro eNB (MeNB)) and a cell of a low-power base station (Low Power Node (LPN)) are simultaneously used as a PCell and an SCell, respectively. In inter-base station (or inter-eNB) carrier aggregation, bearers are independently configured in the PCell and the SCell and communication is performed between an UE and the MeNB and between the UE and the LPN.

In the inter-eNB CA, it is also conceivable that the MeNB controls the configuration of radio parameters and the like of both the PCell and the SCell. However, for example, when the MeNB attempts to change radio parameters or the like of the SCell in a manner similar to that for ordinary CA (i.e., intra-eNB CA) when DL data is being transmitted in the SCell, the UE suspends the reception of the DL data in the SCell while the UE is changing radio parameters of the SCell under the instruction from the MeNB. Meanwhile, it is conceivable that the LPN that serves the SCell does not recognize that the UE is changing the radio parameter and thus continues to transmit the DL data. Accordingly, the transmission of the DL data that is performed when the UE is changing the radio parameter fails, thus possibly causing packet losses at the worst.

One of the objects of the present invention is to provide a radio communication system, a radio station, a radio terminal, a communication control method, and a program which are contribute to prevention or reduction of data transmission/reception failures which would otherwise occur while configuration of radio parameters or the like is being changed by a radio terminal in carrier aggregation of a plurality of cells served by different radio stations.

Solution to Problem

In a first aspect, a radio communication system includes a first radio station that serves a first cell, a second radio station that serves a second cell, and a radio terminal capable of performing carrier aggregation using the first and second cells. The first radio station is configured to perform, with the radio terminal, radio resource control for the first and second cells in order to perform the carrier aggregation. The first radio station is also configured to transmit, to the second radio station, update information regarding an update to a configuration related to the radio resource control for the second cell.

In a second aspect, a first radio station that serves a first cell includes a communication control unit. The communication control unit supports carrier aggregation using the first cell and a second cell served by a second radio station. The communication control unit performs, with a radio terminal, radio resource control for the first and second cells in order to perform the carrier aggregation. Further, the communication control unit transmits, to the second radio station, update information regarding an update to a configuration related to the radio resource control for the second cell.

In a third aspect, a second radio station that serves a second cell includes a communication control unit. The communication control unit supports carrier aggregation using a first cell served by a first radio station and the second cell. The communication control unit receives, from the first radio station, update information regarding an update to a configuration related to a radio resource control for the second cell. The radio resource control is performed between the first radio station and a radio terminal.

In a fourth aspect, a radio terminal includes a communication control unit that supports carrier aggregation using a first cell served by a first radio station and using a second cell served by a second radio station. The communication control unit performs, with the first radio station, radio resource control for the first and second cells in order to perform the carrier aggregation. Further, the communication control unit receives, from the first radio station, configuration information related to the radio resource control for the second cell.

In a fifth aspect, a communication control method in a first radio station that serves a first cell includes:

(a) performing, with a radio terminal, radio resource control for the first cell and a second cell served by a second radio station, in order to perform a carrier aggregation using the first and second cells; and (b) transmitting, to the second radio station, update information regarding an update to a configuration related to the radio resource control for the second cell.

In a sixth aspect, a communication control method in a second radio station that serves a second cell includes receiving, from a first radio station, update information regarding an update to a configuration related to radio resource control for the second cell. The radio resource control is performed between the first radio station and a radio terminal for carrier aggregation using a first cell served by the first radio station and the second cell.

In a seventh aspect, a communication control method in a radio terminal includes performing, with a first radio station, radio resource control for a first cell served by the first radio station and a second cell served by a second radio station, in order to perform carrier aggregation using the first and second cells. Further, the performing includes receiving, from the first radio station, configuration information related to the radio resource control for the second cell.

In an eighth aspect, a program includes instructions for causing a computer to perform a communication control method according to the above-described fifth aspect.

In a ninth aspect, a program includes instructions for causing a computer to perform a communication control method according to the above-described sixth aspect.

In a tenth aspect, a program includes instructions for causing a computer to perform a communication control method according to the above-described seventh aspect.

Advantageous Effects of Invention

According to the above-described aspects, it is possible to provide a radio communication system, a radio station, a radio terminal, a communication control method, and a program which are contribute to prevention or reduction of data transmission/reception failures which would otherwise occur while the configuration of radio parameters or the like is being changed by a radio terminal in carrier aggregation of a plurality of cells served by different radio stations.

DESCRIPTION OF EMBODIMENTS

Specific embodiments are explained hereinafter in detail with reference to the drawings. The same symbols are assigned to the same or corresponding elements throughout the drawings, and duplicated explanations are omitted as necessary.

First Embodiment

Figure 1:
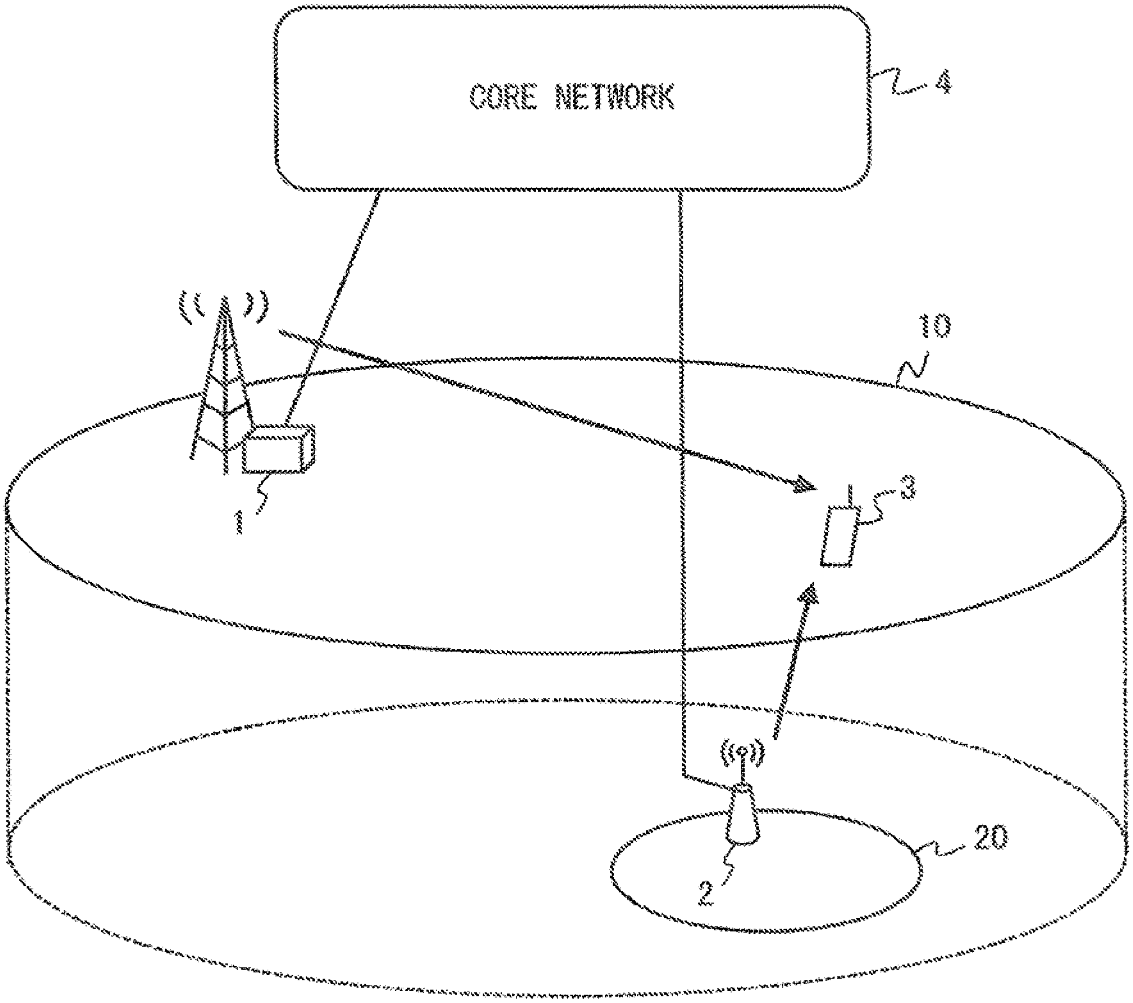
FIG. 1 shows a configuration example of a radio communication system according to a first embodiment.

FIG. 1 shows a configuration example of a radio communication system according to this embodiment. The radio communication system according to this embodiment includes a first radio station 1, a second radio station 2, and a radio terminal 3. The radio stations 1 and 2 are connected to a core network 4 and serve first and second cells 10 and 20, respectively. Each of the radio stations 1 and 2 is, for example, a radio base station, a base station control station, or a simplified radio base station having only some of the functions (protocol layers) of an ordinary radio base station. The radio terminal 3 has a function of, while using a cell of one radio base station, using a cell of another radio station. In other words, the radio terminal 3 supports a carrier aggregation (or cell aggregation) of a plurality of cells served by different radio stations. Note that the different radio stations may be different base stations independent of each other, or may be one radio station and another radio base station dependent on the one radio station. Further, the different radio stations may be radio stations of different types having different functions.

For example, the radio terminal 3 can establish a second radio connection on the second cell 20 while maintaining a first radio connection on the first cell 10. The expression "establishment of a radio connection" corresponds to, for example, a state where the radio terminal 3 can communicate with a radio station (e.g., the radio station 1 or 2), or a state where the radio terminal 3 and a radio station (e.g., the radio station 1 or 2) possess common information necessary for communication therebetween. In this way, the radio terminal 3 can simultaneously use a plurality of cells (e.g., the cells 10 and 20) for transmitting or receiving signals (e.g., user data or control information). The expression "simultaneous use of a plurality of cells" is not limited to actual simultaneous reception or transmission of signals in a plurality of cells. That is, it includes: a state where the radio terminal actually receives or transmits signals in either one of the cells although the radio terminal is able to receive or transmit signals in both of the cells; a state where the radio terminal receives or transmits signals of different types in the respective cells; and a state where the radio terminal uses each of the plurality of cells for either signal reception or signal transmission.

In view of the carrier aggregation of a plurality of cells served by different radio stations, the function of using a plurality of cells served by different radio stations can be called "inter-radio station carrier aggregation". Further, in view of the above-described simultaneous use of a plurality of cells, the function of using a plurality of cells served by different radio stations can also be called "Dual Connection", "Dual Connectivity", "Multi Connection", "Multi Connectivity", or the like.

The radio terminal 3 may transmit to the radio station 1 or the radio station 2 a terminal capability report indicating that the radio terminal 3 is capable of performing inter-radio station carrier aggregation (i.e., supports inter-radio station carrier aggregation). Alternatively, the radio terminal 3 may implicitly indicate that the radio terminal 3 supports inter-radio station carrier aggregation by the category of the radio terminal 3 or its device release number. The capability of performing inter-radio station carrier aggregation can also be called "dual-connection capability" or "multi-connection capability".

FIG. 1 shows a Heterogeneous Network (HetNet) environment. Specifically, the first cell 10 shown in FIG. 1 has coverage wider than that of the second cell 20. Further, FIG. 1 shows a hierarchical cell structure in which the second cell 20 is disposed inside the first cell 10. Note that the cell structure shown in FIG. 1 is merely an example. For example, the first and second cells 10 and 20 may have the same degree of coverage. In other words, the radio communication system according to this embodiment may be applied to a Homogeneous Network environment.

Next, an operation of the radio communication system according to this embodiment is explained in a more detailed manner. In a radio communication system according to this embodiment, the first radio station 1 has control and management functions (e.g., an RRC layer) for the first and second cells 10 and 20 for performing inter-radio station carrier aggregation of the first and second cells 10 and 20. Specifically, the first radio station 1 performs, with the radio terminal 3, radio resource control for the cells 10 and 20 in order to perform carrier aggregation of the cells 10 and 20. The first radio station 1 may transmit a configuration related to the radio resource control to the radio terminal 3 in the first cell 10, or may transmit the configuration to the radio terminal 3 in the second cell 20 through the second radio station 2. In the latter case, although the first radio station 1 transmits to the second radio station 2 a message containing the configuration related to the radio resource control for the second cell 20, the second radio station 2 does not necessarily have to recognize the contents of that message. Alternatively, the second radio station 2 may recognize the contents of the message. When the second radio station 2 transmits the configuration related to the radio resource control in the second cell 20, the second radio station 2 may transmit the configuration in a manner similar to that for transmitting other downlink data. The first radio station 1 is also configured to transmit, to the second base station 2, update information regarding an update to the configuration related to the radio resource control for the second cell 20.

The above-described update information transmitted from the first radio station 1 to the second radio station 2 triggers, for example, a stop or a suspension of at least one of downlink transmission and uplink reception in the second cell 20 performed by the second radio station 2. The above-described update information may explicitly or implicitly indicate, for example, at least one of the following items (a) to (d):

(a) A start report about a start of the update (or a change) to the configuration related to the radio resource control for the second cell 20;

(b) A start notification of a start of the update (or a change) to the configuration related to the radio resource control for the second cell 20;

(c) An advance notification of the update (or a change) to the configuration related to the radio resource control for the second cell 20; and (d) A completion prediction of the completion of the update (or a change) to the configuration related to the radio resource control for the second cell 20.

When the above-described update information indicates a start report of the update (i.e., the update has already been started), a start notification of the update (i.e., the update is about to be started), or an advance notification of the update (i.e., the update is scheduled to be started from now), the first radio station 1 may transmit information indicating an end timing (or a prediction of an end timing) of the update to the configuration related to the radio resource control for the second cell 20 together with the start report, the start notification, or the advance notification. Alternatively, the first radio station 1 may transmit to the second radio station 2 a completion notification when the update to the configuration related to the radio resource control for the second cell 20 has been completed.

When the above-described update information is an advance notification of the update, the first radio station 1 may transmit information about update (start) timing together with the update advance notification.

The information about the update (start) timing or the information about the end timing of the update, which is indicated by the above-described update information, may be indicated using, for example, a timer value or by a frame number (e.g., System Frame Number (SFN)).

The above-described update information does not necessarily have to be a simple update notification or a simple update advance notification. That is, the above-described update information may be a configuration related to the radio resource control for the second cell 20 that is the same as the configuration to be transmitted from the first radio station 1 to the radio terminal 3, or control information related to that configuration. Further, the configuration or the control information may be transmitted from the first radio station 1 using an inter-radio station control message. In this case, upon receiving the control message, the second radio station 2 may determine that the second radio station 2 has implicitly received the start report, start notification, or advance notification of the update (or the change) to the configuration related to the radio resource control for the second cell 20. That is, the first radio station 1 may implicitly notify the second radio station 2 of one of the above-listed items (a) to (d) by transmitting to the second radio station 2 the configuration related to the radio resource control for the second cell 20, which is to be updated, or the control information related to that configuration.

The first radio station 1 may individually transmit the above-described update information to the second radio station 2 for each radio terminal 3, or collectively transmit it to the second radio station 2 for a plurality of or all of radio terminals 3 that perform communication in the second cell 20.

The first radio station 1 may transmit to the second radio station 2 the above-described update information (i.e., the update information regarding the update to the configuration related to the radio resource control for the second cell 20) together with update information regarding an update to a configuration related to radio resource control for a cell(s) other than the second cell 20 (e.g., the first cell 10). Alternatively, the first radio station 1 may transmit update information regarding an update to a configuration related to radio resource control for the first cell 10 as the above-described update information (i.e., the update information regarding the update to the configuration related to the radio resource control for the second cell 20).

Upon receiving the above-described update information (i.e., the update information regarding the update to the configuration related to the radio resource control for the second cell 20), the second radio station 2 may operate, for example, as follows. The second radio station 2 controls signal transmission and/or reception to and/or from the radio terminal 3 in the second cell 20. In an example, the second radio station 2 may stop or suspend at least one of signal transmission to the radio terminal 3 and signal reception from the radio terminal 3 in the second cell 20 while the update to the configuration related to the radio resource control for the second cell 20 is being performed or is expected to be performed by the radio terminal 3.

Next, control and management for the first and second cells 10 and 20 performed by the first radio station 1 is explained. The first radio station 1 transmits, for example, a configuration related to the radio resource control for the cells 10 and 20 to the radio terminal 3 in the first cell 10. The radio terminal 3 transmits and/or receives signals in accordance with the received configuration related to the radio resource control. In an example, upon receiving the configuration related to the radio resource control, the radio terminal 3 may refrain from transmitting and receiving signals (e.g., data) in the second cell 20 during the period in which the radio terminal 3 is performing or updating the configuration related to the radio resource control for the second cell 20. In this period, the radio terminal 3 may transmit and receive signals in the first cell 10 as usual, or may also refrain from transmitting and/or receiving signals (e.g., data) in the first cell 10.

The configuration related to the radio resource control for the cells 10 and 20 may be, but is not limited to, a configuration of radio parameters or the like. For example, the configuration related to the radio resource control may include at least one of a radio parameter configuration, a terminal measurement configuration, a configuration related to a certain function, and a secondary configuration.

The first radio station 1 may individually transmit the configuration information related to the radio resource control for the second cell 20 (in other words, an instruction about the configuration or the configuration update) to each radio terminal 3 in the first cell 10, or collectively transmit it to a plurality of or all of radio terminals 3 that perform communication in the first cell 10 by using a common message.

As described above, in this embodiment, the first radio station 1 performs and updates, with the radio terminal 3 in the first cell 10, the configuration related to the radio resource control for the second cell in order to perform the inter-radio station carrier aggregation of the cells 10 and 20. Further, the first radio station 1 transmits, to the second radio station 2, update information regarding the update to the configuration related to the radio resource control for the second cell 20. As a result, the second radio station 2 can recognize that the update to the configuration related to the radio resource control for the second cell 20 is performed by the radio terminal 3. Therefore, for example, the second radio station 2 can stop or suspend at least one of signal transmission to the radio terminal 3 and signal reception from the radio terminal 3 in the second cell 20 while the update to the configuration related to the radio resource control for the second cell 20 is being performed or is expected to be performed in the radio terminal 3. As a result, this embodiment can contribute to prevention or reduction of data transmission/reception failures which would otherwise occur while the configuration of radio parameters or the like is being changed by the radio terminal 3.

Figure 2:
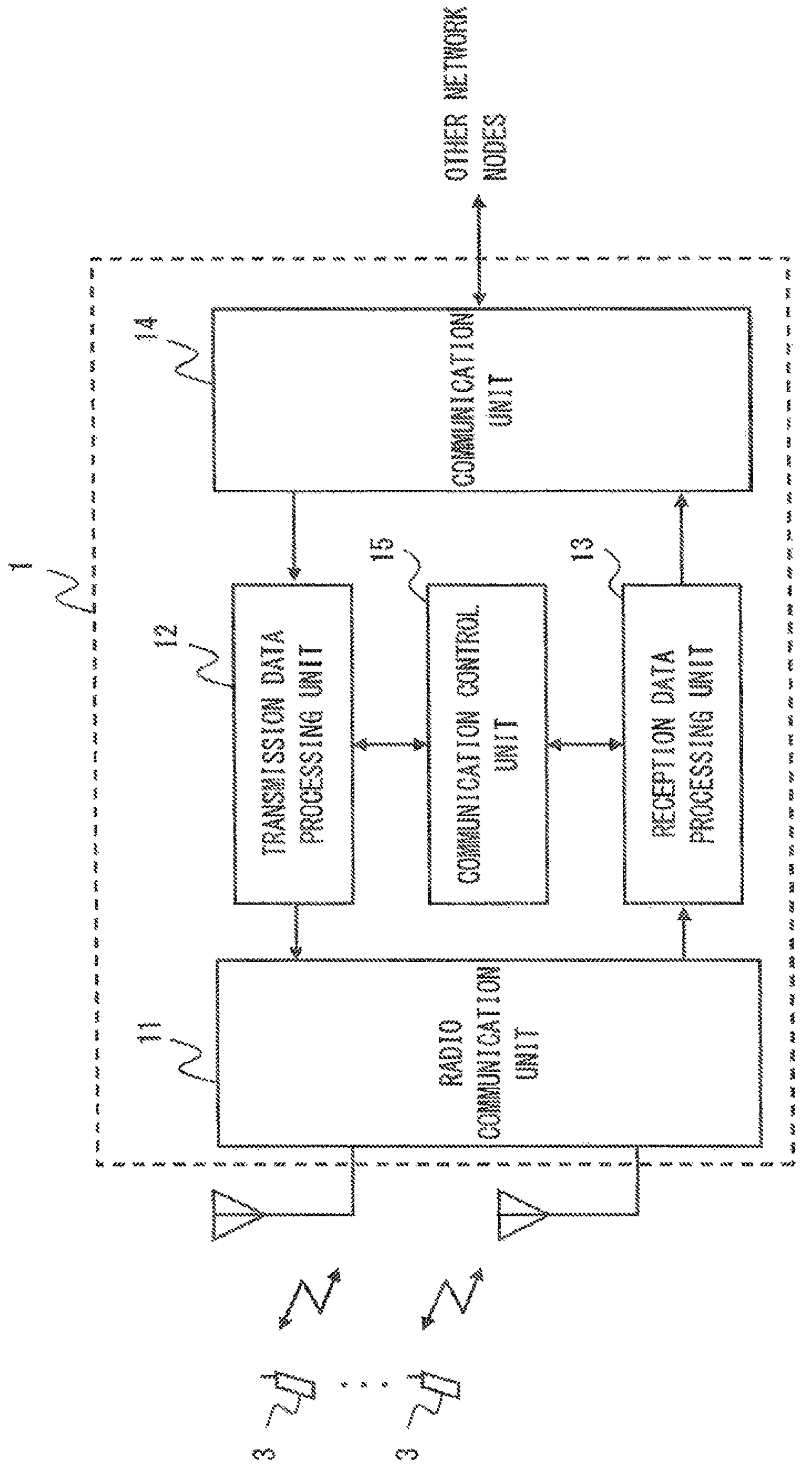
FIG. 2 shows a configuration example of a first radio station according to the first embodiment.

Next, configuration examples of the radio stations 1 and 2 and the radio terminal 3 according to this embodiment are explained. FIG. 2 is a block diagram showing a configuration example of the first radio station 1. A radio communication unit 11 receives an uplink signal transmitted from the radio terminal 3 thorough an antenna. A reception data processing unit 13 restores the received uplink signal. The obtained reception data is forwarded to another network node such as a data transfer device or a mobility management device in the core network 4, or to other radio stations through a communication unit 14. For example, uplink user data received from the radio terminal 3 is forwarded to a data transfer device in a higher-layer network. Further, non-access stratum (NAS) control data among control data received from the radio terminal 3 is forwarded to a mobility management device in a higher-layer network. Further, the reception data processing unit 13 receives, from a communication control unit 15, control data to be transmitted to the radio station 2, and transmits this control data to the radio station 2 through the communication unit 14.

A transmission data processing unit 12 acquires user data destined for the radio terminal 3 from the communication unit 14 and generates a transport channel by performing error correction encoding, rate matching, interleaving, and the like. Further, the transmission data processing unit 12 generates a transmission symbol sequence by adding control information to the data sequence of the transport channel. The radio communication unit 11 generates a downlink signal by performing carrier modulation based on the transmission symbol sequence, frequency conversion, signal amplification, and the like, and transmits the generated downlink signal to the radio terminal 3. Further, the transmission data processing unit 12 receives control data to be transmitted to the radio terminal 3 from the communication control unit 15 and transmits this control data to the radio terminal 3 through the radio communication unit 11.

The communication control unit 15 controls inter-radio station carrier aggregation of the first and second cells 10 and 20. Specifically, the communication control unit 15 performs, with the radio terminal 3 in the first cell 10, radio resource control for the cells 10 and 20 in order to perform carrier aggregation of the cells 10 and 20. Further, the communication control unit 15 transmits to the second radio station 2 the update information regarding the update to the configuration related to the radio resource control for the second cell 20.

Figure 3:
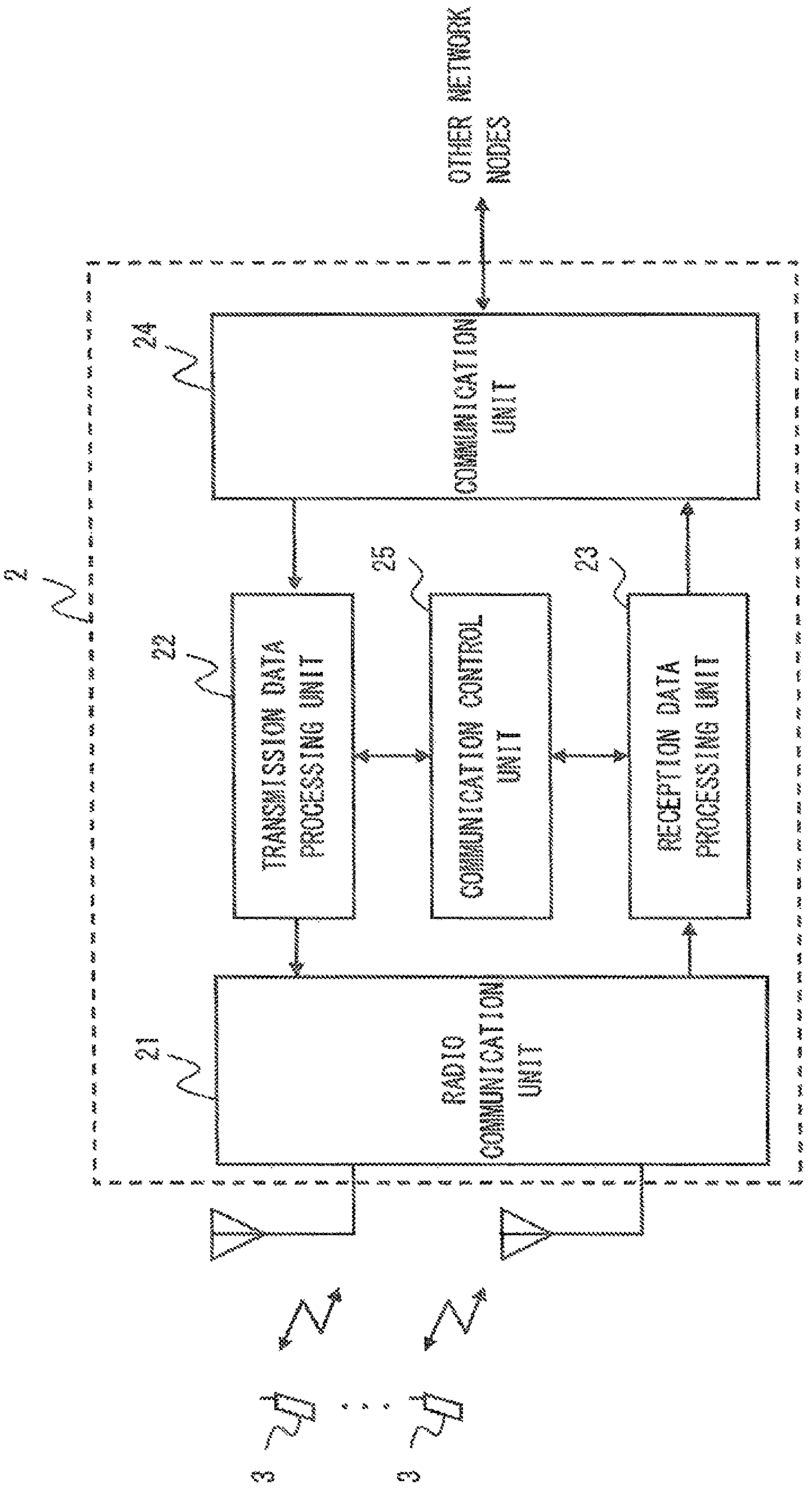
FIG. 3 shows a configuration example of a second radio station according to the first embodiment.

FIG. 3 is a block diagram showing a configuration example of the second radio station 2. The functions and the operations of a radio communication unit 21, a transmission data processing unit 22, a reception data processing unit 23, and a communication unit 24 shown in FIG. 3 are similar to those of their corresponding elements shown in FIG. 2, i.e., those of the radio communication unit 11, the transmission data processing unit 12, the reception data processing unit 13, and the communication unit 14.

A communication control unit 25, in the radio station 2, controls inter-radio station carrier aggregation of the first and second cells 10 and 20. Further, the communication control unit 25 receives from the first radio station 1 the update information regarding the update to the configuration related to the radio resource control for the second cell 20. In an example, the communication control unit 25 may stop or suspend at least one of downlink transmission and uplink reception in the second cell 20 during a period specified based on the received update information (i.e., a period in which the update to the configuration related to the radio resource control for the second cell 20 is being performed or is expected to be performed in the radio terminal 3).

Figure 4:
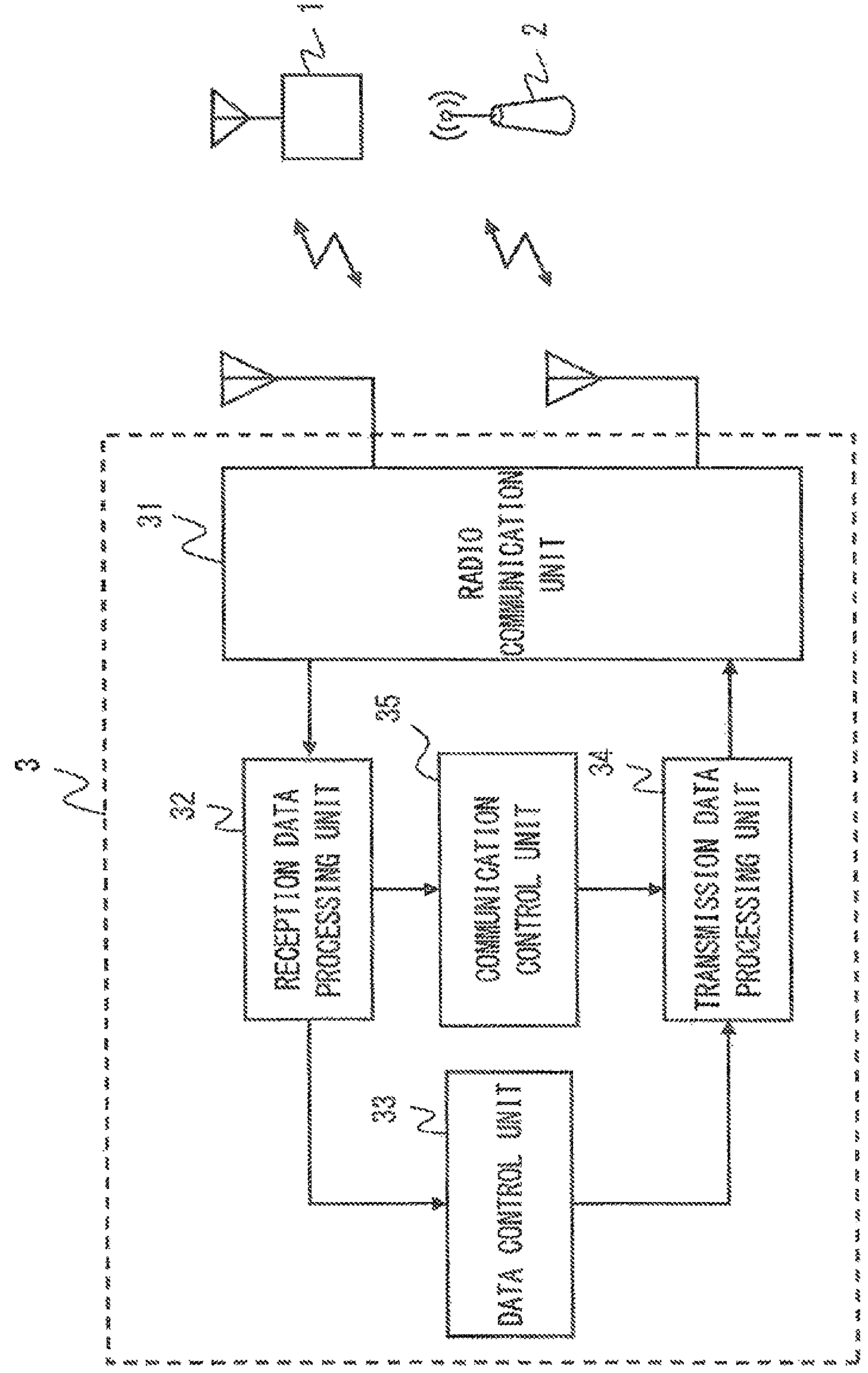
FIG. 4 shows a configuration example of a radio terminal according to the first embodiment.

FIG. 4 is a block diagram showing a configuration example of the radio terminal 3. A radio communication unit 31 supports carrier aggregation of a plurality of cells served by different radio stations, and is able to simultaneously use the plurality of cells (e.g., the cells 10 and 20) for transmitting or receiving signals. Specifically, the radio communication unit 31 receives a downlink signal from one or both of the radio stations 1 and 2 through an antenna. A reception data processing unit 32 restores reception data from the received downlink signal and sends the restored reception data to a data control unit 33. The data control unit 33 uses the reception data according to its purpose. Further, a transmission data processing unit 34 and a radio communication unit 31 generate an uplink signal by using transmission data supplied from the data control unit 33 and transmit the generated uplink signal to one or both of the radio stations 1 and 2.

A communication control unit 35, in the radio terminal 3, controls inter-radio station carrier aggregation of the first and second cells 10 and 20. Further, the communication control unit 35 receives, from the first radio station 1 in the first cell 10, the configuration related to the radio resource control for the cells 10 and 20, and performs or updates the configuration for the radio resource control for the cells 10 and 20. In an example, the communication control unit 35 may stop or suspend at least one of signal transmission to the second radio station 2 and signal reception from the second radio station 2 in the second cell 20 while the radio terminal 3 is performing or updating the configuration related to the radio resource control for the second cell 20.

Next, Procedure Examples 1 to 3 of a communication control method in a radio communication system according to this embodiment are explained hereinafter.

Procedure Example 1

Figure 5:
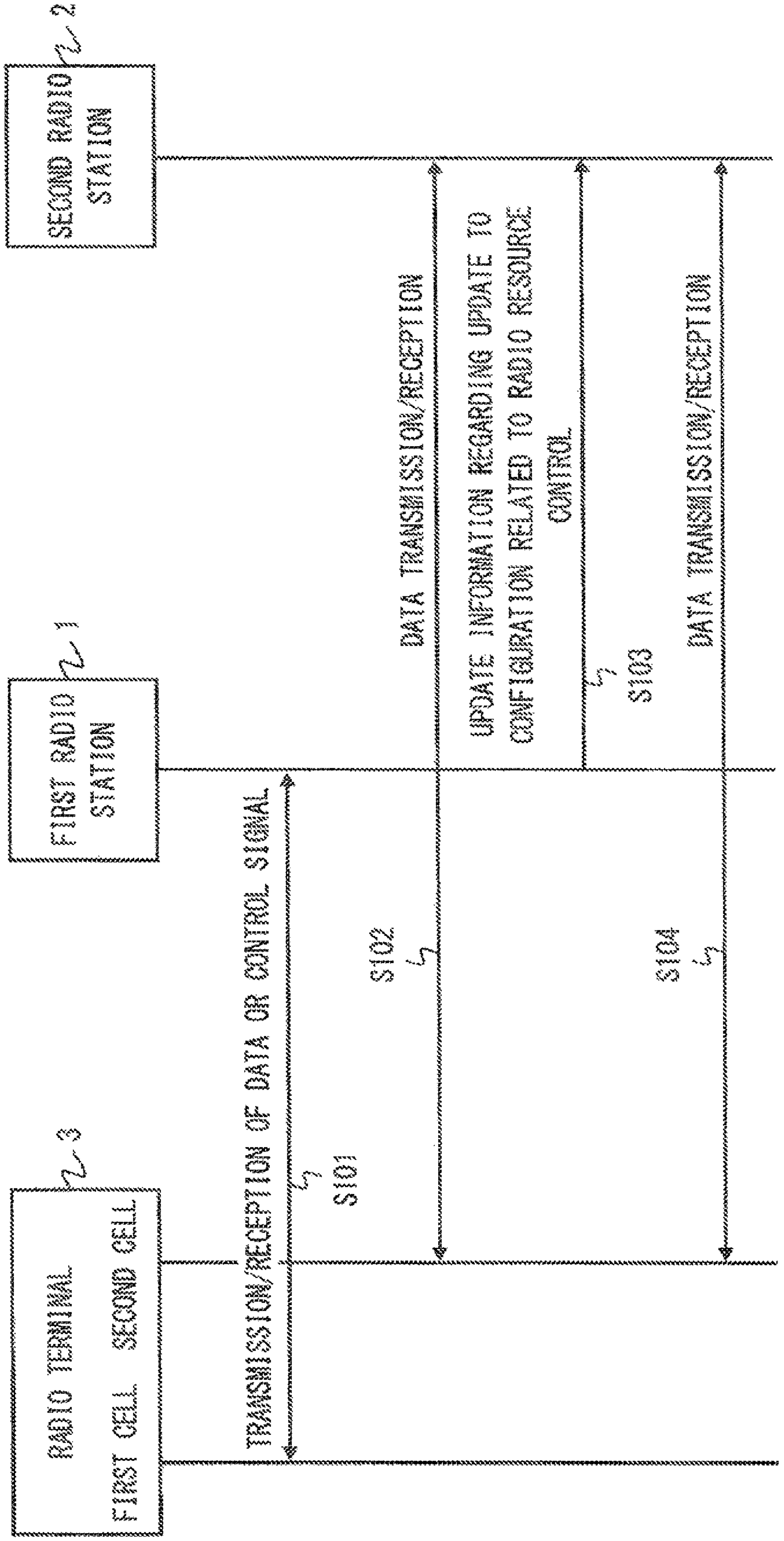
FIG. 5 is a sequence diagram showing an example of a communication control method in a radio communication system according to the first embodiment (Procedure Example 1)

In Procedure Example 1, the first radio station 1 transmits, to the radio station 2, the update information regarding the update to the configuration related to the radio resource control for the radio terminal 3 in the second cell 20. FIG. 5 shows an example of a sequence diagram showing a communication control method according to the Procedure Example 1. In steps S101 and S102, the radio terminal 3 performs carrier aggregation of the first and second cells 10 and 20. That is, in the steps S101 and S102, the first radio station 1 transmits and/or receives data or control information to and/or from the radio terminal 3 in the first cell 10, and meanwhile the second radio station 2 transmits and/or receives data to and/or from the radio terminal 3 in the second cell 20.

In a step S103, the first radio station 1 determines that the configuration related to the radio resource control for the second cell 20 needs to be changed, and hence transmits, to the second radio station 2, the update information regarding the update to the configuration related to the radio resource control for the second cell 20. In a step S104, the second radio station 2 transmits and/or receives data to and/or from the radio terminal 3 in the second cell 20 while taking account of the update information received in the step S103. In one example, the second radio station 2 does not transmit or receive data to or from the radio terminal 3 while the configuration related to the radio resource control for the second cell 20 is being changed in the radio terminal 3. Accordingly, data transmission in the second cell 20 is appropriately performed and packet losses and the like can be prevented.

Note that though it is not clearly shown in FIG. 5, in the Procedure Example 1, the second radio station 2 may also change the configuration of the radio resource control for the second cell 20. For example, the update information regarding the update to the configuration related to the radio resource control, which is transmitted from the first radio station 1, includes configuration information related to the radio resource control that should be changed by the second radio station 2. The second radio station 2 may change the configuration related to the radio resource control for the second cell 20 upon receiving the configuration information. Alternatively, the second radio station 2 may change the configuration related to the radio resource control for the second cell 20 at the same timing as that at which this configuration is changed in the radio terminal 3. The configuration information related to the radio resource control that should be changed by the second radio station 2 may be different for each radio terminal 3 that performs communication in the second cell 20, or may be common to a plurality of or all of radio terminals 3 that perform communication in the second cell 20. The use of the common configuration information can reduce the number of signals transmitted between the radio stations 1 and 2.

Procedure Example 2

In Procedure Example 2, the first radio station 1 transmits, to the second radio station 2, a start notification of the update (i.e., a notification that the update is about to be started) as the update information regarding the update to the configuration related to the radio resource control for the radio terminal 3 in the second cell 20. Further, the first radio station 1 notifies the second radio station 2 that the radio terminal 3 has completed the update to the configuration related to the radio resource control.

Figure 6:
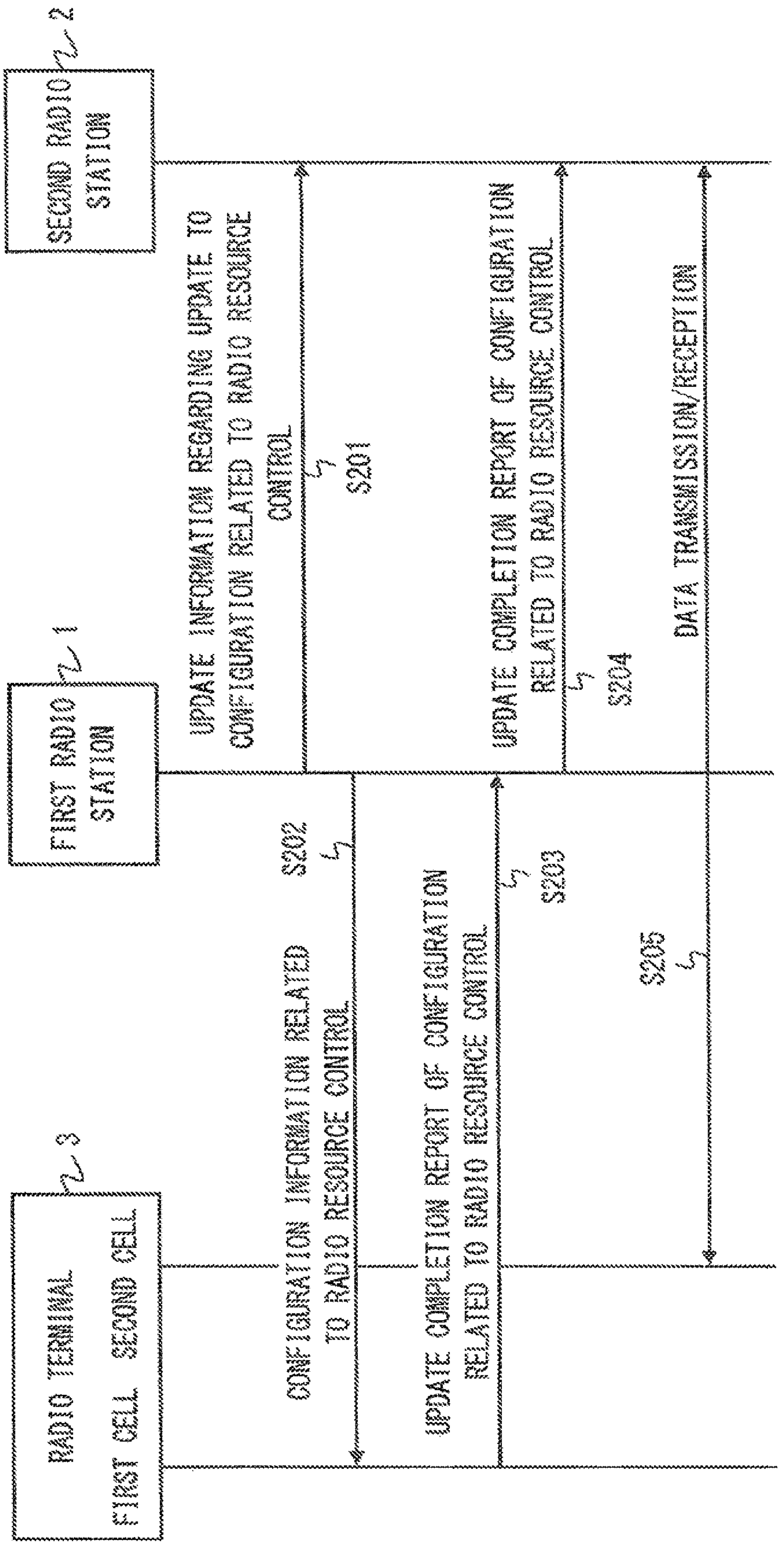
FIG. 6 is a sequence diagram showing an example of a communication control method in a radio communication system according to the first embodiment (Procedure Example 2)

FIG. 6 shows an example of a sequence diagram showing a communication control method according to the Procedure Example 2. In a step S201, the first radio station 1 determines that the configuration related to the radio resource control for the second cell 20 needs to be changed, and hence transmits, to the second radio station 2, a start notification of the update to the configuration as the update information regarding the update to the configuration related to the radio resource control. In a step S203, the first radio station 1 transmits, to the radio terminal 3, configuration information related to the radio resource control for the second cell 20.

The radio terminal 3 updates the configuration related to the radio resource control for the second cell 20 according to the received configuration information and reports the completion of the update to the first radio station 1 (step S203). The radio terminal 3 may refrain from transmitting and receiving signals (e.g., data) in the second cell 20 while the radio terminal 3 is updating the configuration related to the radio resource control for the second cell 20.

In a step S204, the first radio station 1 notifies the second radio station 2 that the UE 3 has completed the update to the configuration related to the radio resource control for the second cell 20. In a step S205, the second radio station 2 resumes or starts data transmission and/or reception to and/or from the radio terminal 3 in the second cell 20. As described above, the second radio station 2 does not transmit or receive data to or from the radio terminal 3 while the configuration related to the radio resource control for the second cell 20 is being changed in the radio terminal 3. Accordingly, data transmission in the second cell 20 is appropriately performed and packet losses and the like can be prevented.

In the Procedure Example 2, the update information regarding the update to the configuration related to the radio resource control, which is transmitted in the step S201, may include information about update (start) timing of that configuration or may include information indicating that the update to that configuration has been started.

In the Procedure Example 2, similarly to the supplementary explanation in the Procedure Example 1, the second radio station 2 may also change the configuration of the radio resource control for the second cell 20. For example, the update information regarding the update to the configuration related to the radio resource control, which is transmitted from the first radio station 1, includes configuration information related to the radio resource control that should be changed by the second radio station 2.

Procedure Example 3

In Procedure Example 3, the first radio station 1 transmits to the second radio station 2, as the update information regarding the update to the configuration related to the radio resource control for the radio terminal 3 in the second cell 20, a start notification of the update (i.e., a notification that the update is about to be started) and information indicating a completion prediction of the update to the configuration performed by the radio terminal 3 (e.g., a timer value).

Figure 7:
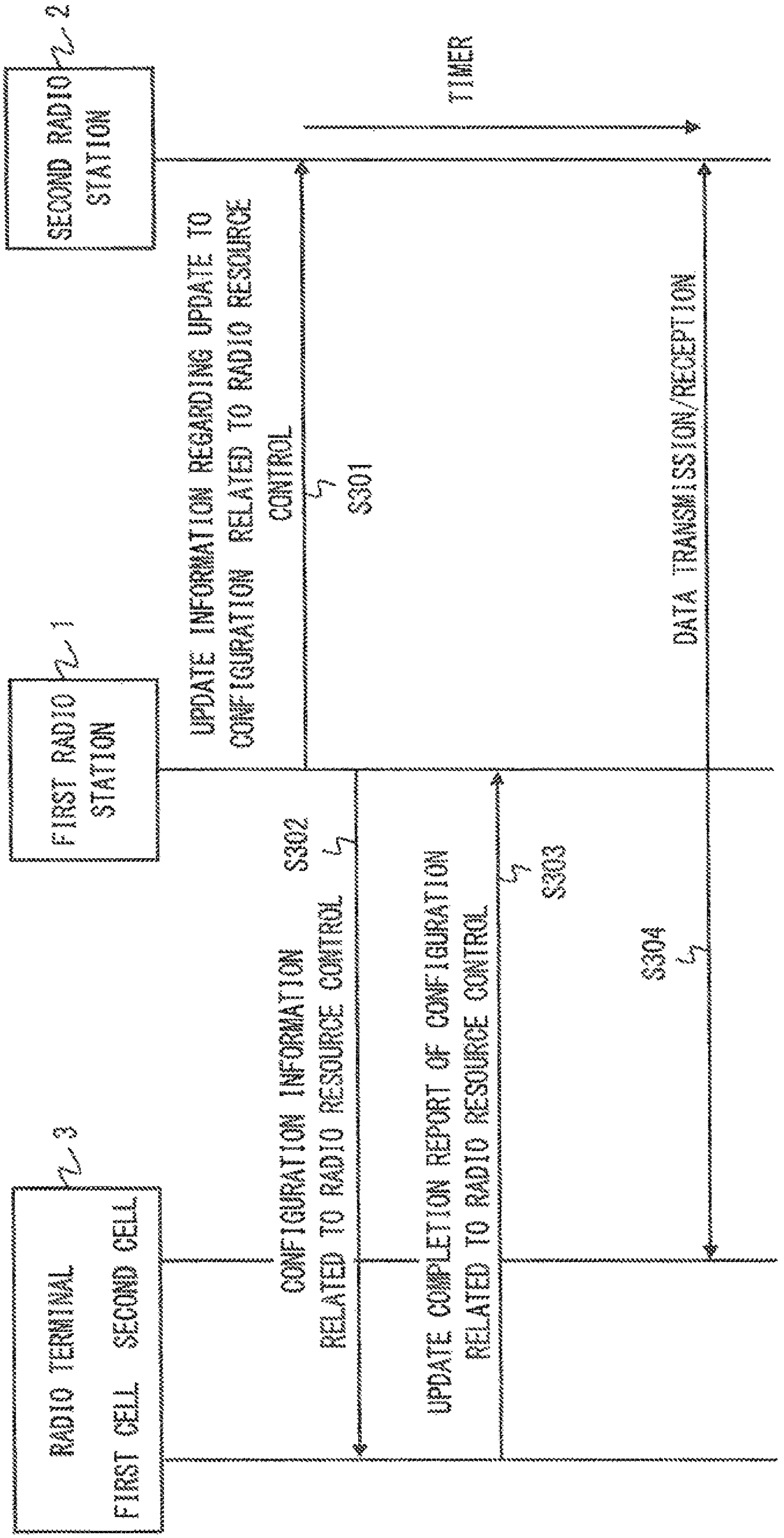
FIG. 7 is a sequence diagram showing an example of a communication control method in a radio communication system according to the first embodiment (Procedure Example 3)

FIG. 7 shows an example of a sequence diagram showing a communication control method according to the Procedure Example 3. In a step S201, the first radio station 1 determines that the configuration related to the radio resource control for the second cell 20 needs to be changed, and hence transmits to the second radio station 2, as the update information regarding the update to the configuration related to the radio resource control, information indicating a start notification of the update to the configuration and information indicating the completion prediction of the update to the configuration performed by the radio terminal 3. The information indicating the prediction of the completion is, for example, a timer value (a timer configuration value). The second radio station 2 activates a timer according to the timer value, i.e., the second radio station 2 starts measurement. The timer is used to determine the completion (or the prediction of the completion) of the update to the configuration related to the radio resource control.

In a step S302, the first radio station 1 transmits, to the radio terminal 3, configuration information related to the radio resource control for the second cell 20. The radio terminal 3 updates the configuration related to the radio resource control for the second cell 20 according to the received configuration information and reports the completion of the update to the first radio station 1 (step S303). The radio terminal 3 may refrain from transmitting and receiving signals (e.g., data) in the second cell 20 while the radio terminal 3 is updating the configuration related to the radio resource control for the second cell 20.

The second radio station 2 resumes or starts data transmission and/or reception to and/or from the radio terminal 3 in the second cell 20 after the timer (i.e., the timer value) has expired (step S304). Note that, the information indicating the prediction of the completion of the update to the configuration related to the radio resource control may be a frame number (e.g., an SFN) or the like instead of the time value. In the example, the second radio station 2 does not transmit and receive data to and from the radio terminal 3 while the configuration related to the radio resource control for the second cell 20 is being changed in the radio terminal 3. Accordingly, data transmission in the second cell 20 is appropriately performed and packet losses and the like can be prevented.

In the Procedure Example 3, the update information regarding the update to the configuration related to the radio resource control, which is transmitted in the step S301, may include information about update (start) timing of that configuration or may include information indicating that the update to that configuration has been started.

In the Procedure Example 3, similarly to the supplementary explanation in the Procedure Example 1, the second radio station 2 may also change the configuration of the radio resource control for the second cell 20. For example, the update information regarding the update to the configuration related to the radio resource control, which is transmitted from the first radio station 1, includes configuration information related to the radio resource control that should be changed by the second radio station 2.

Second Embodiment

In this embodiment, an example where the above-described first embodiment is applied to a 3GPP LTE system is explained. A configuration example of a radio communication system according to this embodiment may be similar to that shown in FIG. 1. Note that the radio stations 1 and 2 correspond to eNBs, the radio terminal 3 corresponds to an UE, and the core network 4 corresponds to an EPC (Evolved Packet Core). Transmission and reception of information between radio stations (i.e., between eNBs) may use an X2 interface, which is a direct interface, may use an S1 interface through the EPC, or may use a newly-defined interface (e.g., an X3 interface). The following explanation is given on the assumption that: the radio stations 1 and 2 are eNBs 1 and 2; the radio terminal 3 is an UE 3; and the core network 4 is an EPC 4.

The radio terminal (UE) 3 can establish a second radio connection in the second cell 20 (Cell 20) while maintaining a first radio connection in the first cell 10 (Cell 10). The expression "establishment of a radio connection" corresponds to, for example, a state where the UE 3 can communicate with an eNB (e.g., the eNB 1 or 2) (e.g., a state where RRC Connection Setup has already been completed), or a state where the UE 3 and an eNB (e.g., the eNB 1 or 2) possess common information (e.g., UE context) necessary for communication therebetween. More specifically, the UE 3 supports carrier aggregation of a plurality of cells served by different radio stations (eNBs) (called "Inter-eNB CA" or "Inter-Site CA"). Note that the term "Inter-eNB CA" in this specification is not limited to actual simultaneous reception or transmission of signals in different eNB cells. For example the "Inter-eNB CA" includes: a state where the radio terminal (UE) actually receives or transmits signals (e.g., user data or control information) in either one of the eNB cells although the UE 3 is able to receive or transmit signals in both of the different eNB cells; a state where the radio terminal receives or transmits signals of different types in the respective cells of different eNBs; and a state where the radio terminal uses each of the cells of different eNBs for either signal reception or signal transmission.

As an example to which this embodiment is applied, it is conceivable that the UE 3 performs inter-radio base station carrier aggregation (Inter-eNB CA) in which the UE 3 uses the Cell 20 of the eNB 2 as a secondary cell (SCell) while the UE 3 is already using the Cell 10 of the eNB 1 as a primary cell (PCell). The primary cell (PCell) is a cell that has already been used since before the CA is started. In contrast to this, the second cell (SCell) is a cell that is used (activated) in addition to the PCell or in dependence thereon on the precondition that the UE 3 is already connected to the primary cell. Non-Access Stratum (NAS) mobility information, security information (or security input), and the like are transmitted and received through the PCell when a radio connection is established (i.e., at the time of RRC Connection Establishment) or reestablished (i.e., at the time of RRC Connection Re-establishment). A DL Component Carrier used for the PCell is a DL PCC, and an UL Component Carrier used for the PCell is an UL PCC. Similarly, a DL Component Carrier used for the SCell is a DL SCC, and an UL Component Carrier used for the SCell is an UL SCC.

The radio terminal (UE) 3 establishes a radio connection (RRC Connection) with the first radio base station (eNB) 1 in the first cell 10 (Cell 10, e.g., PCell), and establishes a radio connection with the second radio base station (eNB) 2 in the second cell 20 (Cell 20, e.g., SCell). The eNB 1 has control and management functions (e.g., an RRC layer) in the Cell 10 and the Cell 20. Specifically, the eNB 1 preforms, with the UE 3, radio resource control for the Cell 10 and the Cell 20 in order to perform carrier aggregation of the Cell 10 and the Cell 20. The eNB 1 may transmit a configuration related to the radio resource control to the UE 3 in the Cell 10, or may transmit the configuration to the UE 3 through the Cell 20 via the eNB 2. In the latter case, although the eNB 1 transmits a message including the configuration, which is related to the radio resource control for the Cell 20, to the eNB 2 through an X2 interface or an S1 interface (or a new interface), the eNB 2 does not necessarily have to recognize the contents of that message. Alternatively, the eNB 2 may recognize the contents of the message. When the eNB 2 transmits the configuration related to the radio resource control in the Cell 20, the eNB 2 may transmit the configuration on a Data Radio Bearer (DRB) in a manner similar to that for transmitting other data. The eNB 1 is also configured to transmit, to the eNB 2, update information (Radio Resource Configuration update information) regarding an update to the configuration related to the radio resource control for the Cell 20.

The above-described update information may explicitly or implicitly indicate at least one of the following items (a) to (d):

(a) A start report about a start of the update (or a change) to the configuration related to the radio resource control for the Cell 20;

(b) A start notification of a start of the update (or a change) to the configuration related to the radio resource control for the Cell 20;

(c) An advance notification of the update (or a change) to the configuration related to the radio resource control for the Cell 20; and (d) A completion prediction of the completion of the update (or a change) to the configuration related to the radio resource control for the Cell 20.

When the above-described update information indicates a start report of the update, a start notification of the update, or an advance notification of the update, the eNB 1 may transmit information about an end timing (also called "Completion time") (or a prediction of an end timing) together with the start report, the start notification, or the advance notification. The end timing indicates "a prediction of the completion of the update of the configuration related to the radio resource control for the Cell 20 (e.g., the SCell)". Alternatively, the eNB 1 may transmit a completion notification of the update to the configuration related to the radio resource control for the Cell 20 (e.g., the SCell) (Radio Resource Configuration update complete indication) upon completing the update to that configuration.

When the above-described update information is an update advance notification, the eNB 1 may transmit information about an update (start) timing (also called "Activation time") together with the update advance notification.

The information about the update (start) timing or the information about the end timing indicated by the above-described update information may be, for example, a timer value or may be indicated by a frame number (e.g., an SFN).

The above-described update information does not necessarily have to be a simple update notification or a simple update advance notification. That is, the above-described update information may be information about a configuration related to the radio resource control for the Cell 20 (e.g., the SCell) that is the same as the configuration to be transmitted from the eNB 1 to the UE 3, or control information related to that configuration. Further, the configuration information or the control information may be transmitted from the eNB 1 using an inter-eNB control message. In this case, upon receiving the control message, the eNB 2 may determine that the eNB 2 has implicitly received the start report, start notification, or advance notification of the update (or the change) to the configuration related to the radio resource control for the Cell 20 (e.g., the SCell).

The eNB 1 may individually transmit the above-described update information to the eNB 2 for each UE 3, or collectively transmit it to the eNB 2 for a plurality of or all of UEs 3 that perform communication in the Cell 20 (e.g., the SCell).

The eNB 1 may transmit to the eNB 2 the above-described update information (i.e., the update information regarding the update to the configuration related to the radio resource control for the Cell 20 (e.g., the SCell)) together with update information regarding an update to a configuration related to radio resource control for a cell(s) other than the Cell 20 (e.g., the Cell 10). Alternatively, the eNB 1 may transmit update information regarding an update to a configuration related to radio resource control for the Cell 10 (e.g., the PCell) as the above-described update information (i.e., the update information regarding the update to the configuration related to the radio resource control for the Cell 20 (e.g., the SCell)).

Upon receiving the above-described update information (i.e., the update information regarding the update to the configuration related to the radio resource control for the Cell 20), the eNB 2 may operate, for example, as follows. The eNB 2 controls transmission and/or reception of signals (i.e., SRB or DRB) to and/or from the UE 3 in the Cell 20. In an example, the eNB 2 may stop or suspend at least one of signal transmission to the UE 3 and signal reception from the UE 3 in the Cell 20 while the update to the configuration related to the radio resource control for the Cell 20 is being performed or is expected to be performed in the UE 3.

Next, control and management for the Cell 10 (e.g., PCell) and the Cell 20 (e.g., SCell) performed by the eNB 1 is explained. The eNB 1 transmits, for example, a configuration related to the radio resource control for the Cells 10 and the Cell 20 to the UE 3 in the Cell 10. The UE 3 transmits and/or receives signals in accordance with the received configuration related to the radio resource control. In an example, upon receiving the configuration related to the radio resource control, the UE 3 may refrain from transmitting and receiving signals (e.g., data) in the Cell 20 during the period in which the UE 3 is performing or updating the configuration related to the radio resource control for the Cell 20. In this period, the UE 3 may transmit/receive signals in the Cell 10 as usual, or may also refrain from transmitting and/or receiving signals (e.g., data) in the Cell 10.

The configuration related to the radio resource control for the Cell 10 and the Cell 20 is, for example, a configuration of radio parameters or the like transmitted by RRC signaling (e.g., RRC Connection Reconfiguration) and includes at least one of the following items (a) to (d):

(a) A radio resource configuration (RadioResourceConfig);

(b) A terminal measurement configuration (MeasConfig);

(c) Other configurations related to a predetermined function (OtherConfig); and (d) A secondary cell configuration (e.g., SCellToAddModList or SC ellToReleaseList).

Note that examples of the OtherConfig include: control information related to a report from the UE 3 on detection of a Closed Subscriber Group (CSG) Cell to which the UE 3 itself can be connected (ReportProximityConfig); control information related to interference among radio systems included in the UE 3 (i.e., included in the radio terminal) (IDC-Config); control information related to an acquisition of location information by the UE 3 (ObtainLocationConfig); and control information related to power consumption and transmission/reception characteristics (e.g., throughput) of the UE 3 (PowerPrefIndicationConfig).

Next, Procedure Examples 4 to 6 of a communication control method in a radio communication system according to this embodiment are explained. Note that it is assumed that the UE 3 performs inter-radio base station carrier aggregation (Inter-eNB CA) in which the UE 3 uses the Cell 20 of the eNB 2 as the SCell while the UE3 is already using the Cell 10 of the eNB 1 as the PCell.

Procedure Example 4

Procedure Example 4 corresponds to the Procedure Example 2 explained in the first embodiment. That is, the eNB 1 transmits an update start notification (configuration update indication) to the eNB 2 as the update information regarding the update to the configuration related to the radio resource control for the UE 3 in the SCell (Radio Resource Configuration update information). Further, the eNB 1 notifies the eNB 2 that the radio terminal 3 has completed the update to the configuration.

Figure 8:
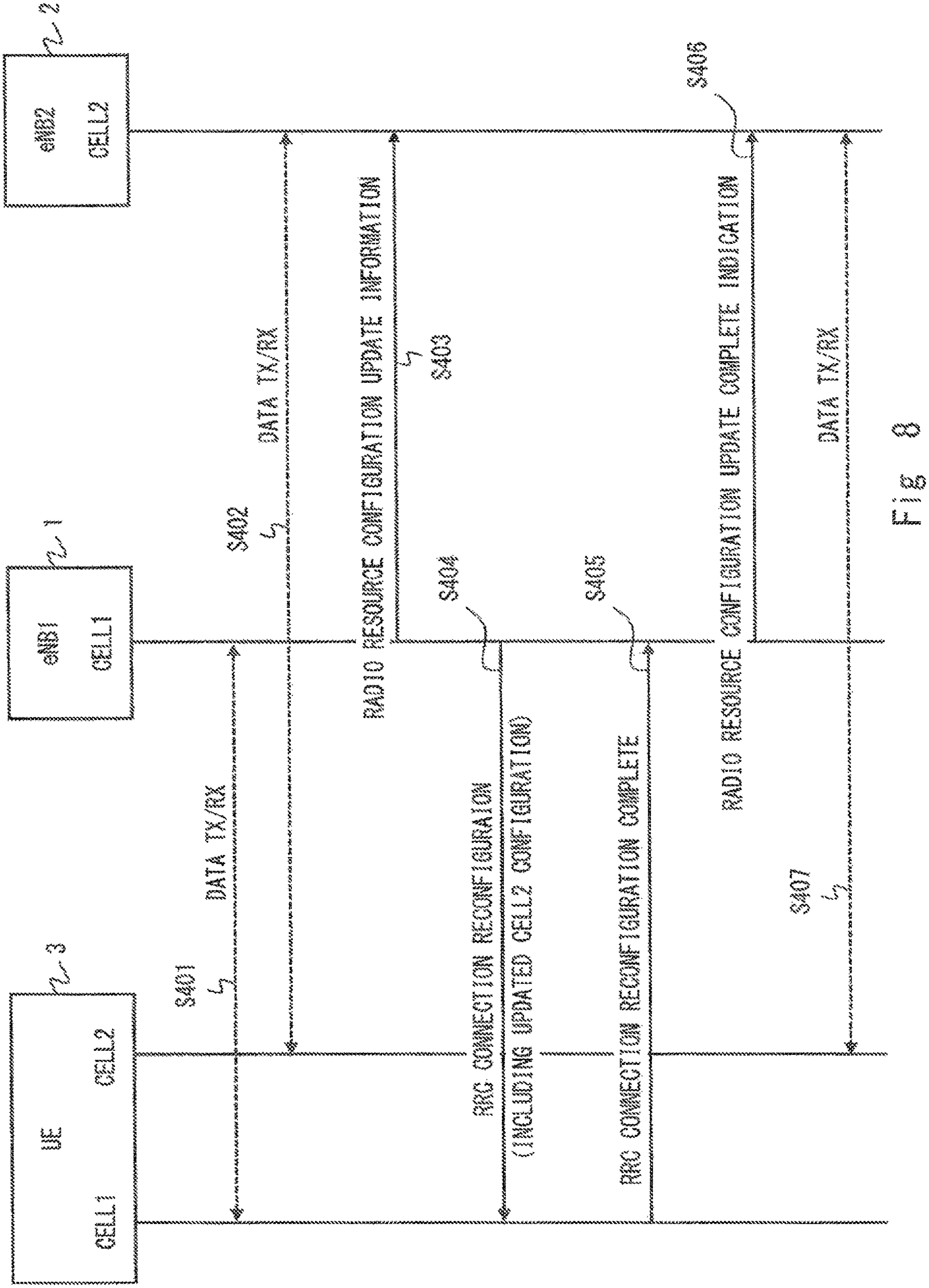
FIG. 8 is a sequence diagram showing an example of a communication control method in a radio communication system according to a second embodiment (Procedure Example 4)

FIG. 8 shows an example of a sequence diagram showing the Procedure Example 4. Note that in FIG. 8, the Cell 10 (i.e., the PCell) and the Cell 20 (i.e., the SCell) are expressed as "CELL1" and "CELL2", respectively. In steps S401 and S402, the UE 3 performs carrier aggregation of the CELL1 and the CELL2. That is, in the steps S401 and S402, the eNB 1 transmits and/or receives data or control information to and/or from the UE 3 in the CELL1 and meanwhile the eNB 2 transmits and/or receives data to and/or from the UE 3 in the CELL2.

In a step S403, the eNB 1 determines that the configuration related to the radio resource control for the CELL2 (SCell) needs to be changed, and hence transmits, to the eNB 2, a start notification of the update to the configuration as the update information regarding the update to the configuration related to the radio resource control. In a step S404, the eNB 1 transmits, to the UE 3, configuration information related to the radio resource control for the CELL2 (RRC Connection Reconfiguration including updated CELL2 configuration).

In a step S405, the UE 3 updates the configuration related to the radio resource control for the CELL2 according to the received configuration information and reports the completion of the update to the eNB 1 (RRC Connection Reconfiguration Complete). The UE 3 may refrain from transmitting and receiving signals (e.g., data) in the CELL2 while the UE 3 is updating the configuration related to the radio resource control for the CELL2.

In a step S406, the eNB 1 notifies the eNB 2 that the UE 3 has completed the update to the configuration related to the radio resource control for the CELL2 (Radio Resource Configuration update complete indication). In a step S407, the eNB 2 resumes or starts data transmission and/or reception to and/or from the UE 3 in the CELL2. The eNB 2 does not transmit or receive data to or from the UE 3 while the configuration related to the radio resource control for the CELL2 (SCell) is being changed in the UE 3. Accordingly, data transmission in the SCell is appropriately performed and packet losses and the like can be prevented. Note that the eNB 1 may also refrain from transmitting and receiving data to and from the UE 3 in the PCell while the configuration related to the radio resource control for the SCell is being changed in the UE 3.

In the Procedure Example 4, the update information regarding the update to the configuration related to the radio resource control, which is transmitted in the step S403, may include information about update (start) timing of that configuration or may include information indicating that the update to that configuration has been started.

Note that though it is not clearly shown in FIG. 8, in the Procedure Example 4, the eNB 2 may also change the configuration of the radio resource control for the CELL2. For example, the update information regarding the update to the configuration related to the radio resource control, which is transmitted from the eNB 1, includes configuration information related to the radio resource control that should be changed by the eNB 2. The eNB 2 may change the configuration related to the radio resource control for the CELL2 upon receiving this configuration information. Alternatively, the eNB 2 may change the configuration related to the radio resource control for the CELL2 at the same timing at which this configuration is changed in the UE 3. The configuration information related to the radio resource control that should be changed by the eNB 2 may be different for each UE 3 that performs communication in the CELL2, or may be common to a plurality of or all of UEs 3 that perform communication in the CELL2. The use of the common configuration information can reduce the number of signals transmitted between the eNBs 1 and 2.

Procedure Example 5

Procedure Example 5 corresponds to the Procedure Example 3 explained in the first embodiment. That is, the eNB 1 transmits to the eNB 2, as the update information regarding the update to the configuration related to the radio resource control for the UE 3 in the SCell (Radio Resource Configuration update information), an update start notification (configuration update indication) and a timber value (timer configuration value) indicating a prediction of the completion of the update to that configuration performed by the UE 3 (expected completion time).

Figure 9:
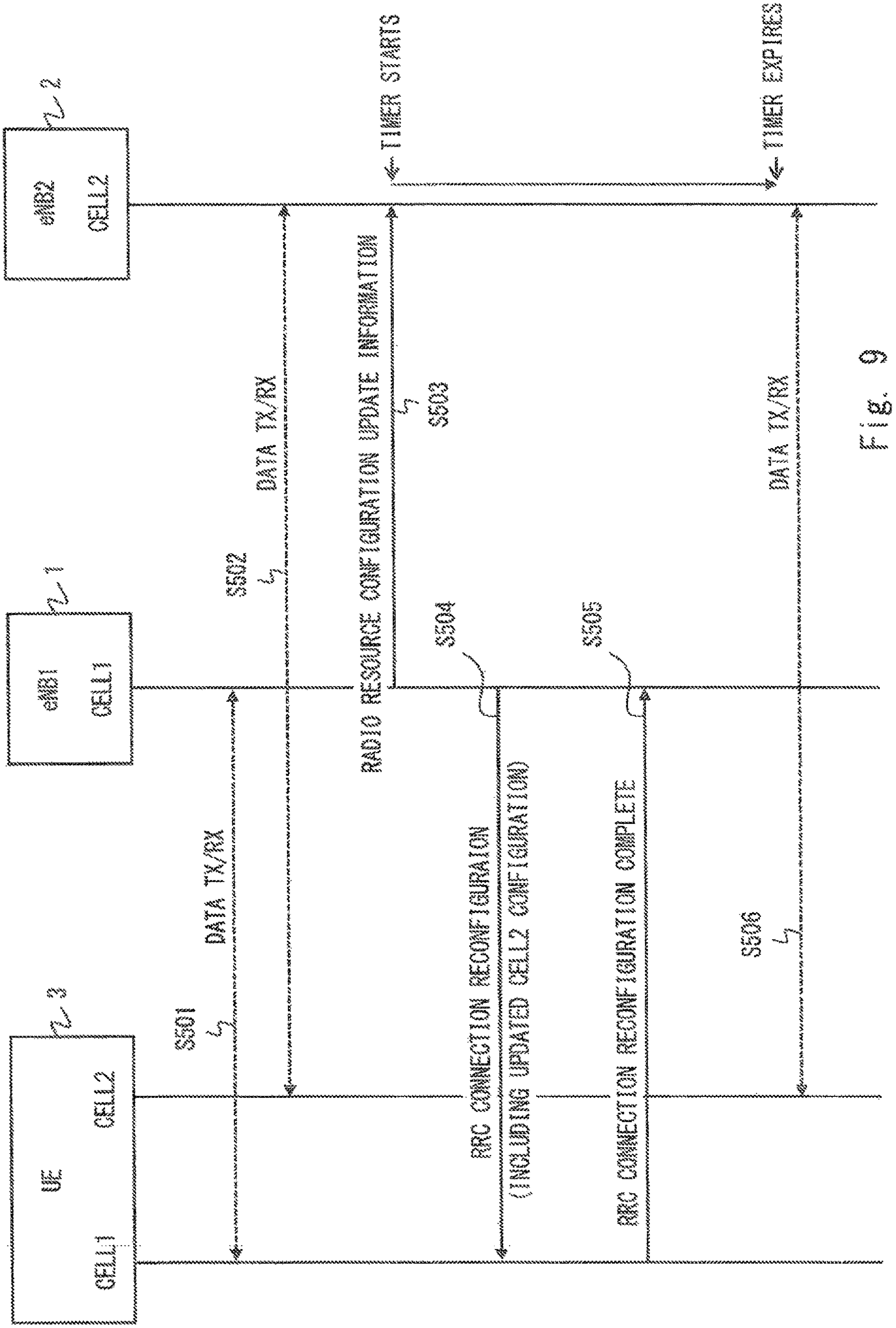
FIG. 9 is a sequence diagram showing an example of a communication control method in a radio communication system according to the second embodiment (Procedure Example 5)

FIG. 9 shows an example of a sequence diagram showing the Procedure Example 5. Note that in FIG. 9, the first cell 10 (i.e., the PCell) and the second cell 20 (i.e., the SCell) are expressed as "CELL1" and "CELL2", respectively. In steps S501 and S502, the UE 3 performs carrier aggregation of the CELL1 and the CELL2. That is, in the steps S501 and S502, the eNB 1 transmits and/or receives data or control information to and/or from the UE 3 in the CELL1 and meanwhile the eNB 2 transmits and/or receives data to and/or from the UE 3 in the CELL2.

In a step S503, the eNB 1 determines that the configuration related to the radio resource control for the CELL2 (SCell) needs to be changed, and hence transmits to the eNB 2, as the update information regarding the update to the configuration related to the radio resource control, a start notification of the update to the configuration and a timer value indicating a prediction of the completion of the update to the configuration performed by the UE 3. The eNB 2 activates a timer according to the received timer value, i.e., the eNB 2 starts measurement. The timer is used to determine the completion (or the prediction of the completion) of the update to the configuration related to the radio resource control.

In a step S504, the eNB 1 transmits, to the UE 3, configuration information related to the radio resource control for the CELL2 (RRC Connection Reconfiguration including updated CELL2 configuration). In a step S505, the UE 3 updates the configuration related to the radio resource control for the CELL2 and reports the completion of that update to the eNB 1 (RRC Connection Reconfiguration Complete). The UE 3 may refrain from transmitting and receiving signals (e.g., data) in the CELL2 while the UE 3 is updating the configuration related to the radio resource control for the CELL2.

The eNB 2 resumes or starts data transmission and/or reception to and/or from the UE 3 in the CELL2 after the timer has expired (step S506). Note that, the information indicating the prediction of the completion of the update to the configuration related to the radio resource control may be a frame number (e.g., an SFN) or the like instead of the time value. In the example, the eNB 2 does not transmit and receive data to and from the UE 3 while the configuration related to the radio resource control for the CELL2 (SCell) is being changed in the UE 3. Accordingly, data transmission in the SCell is appropriately performed and packet losses and the like can be prevented.

In the Procedure Example 5, the update information regarding the update to the configuration related to the radio resource control, which is transmitted in the step S503, may include information about update (start) timing of that configuration or may include information indicating that the update to that configuration has been started.

In the Procedure Example 5, similarly to the supplementary explanation in the Procedure Example 4, the eNB 2 may also change the configuration of the radio resource control for the SCell. For example, the update information regarding the update to the configuration related to the radio resource control, which is transmitted from the eNB 1, includes configuration information related to the radio resource control that should be changed by the eNB 2.

Procedure Example 6

In Procedure Example 6, the eNB 1 transmit, to the eNB 2, an advance notification of a start of the update (expected configuration update information), as the update information regarding the update to the configuration related to the radio resource control for the UE 3 in the SCell (Radio Resource Configuration update information). Further, in this example, an update to system information (System Information Block (SIB)) is assumed as the configuration related to the radio resource control in the SCell. That is, a notification of an update to the system information of the second cell 20, which serves as the SCell, is transmitted in the first cell 10, which serves as the PCell. Alternatively, as described previously, the eNB 1 may notify the UE 3 of the update to the system information of the second cell 20 through the second cell 20 via the eNB 2.

Figure 10:
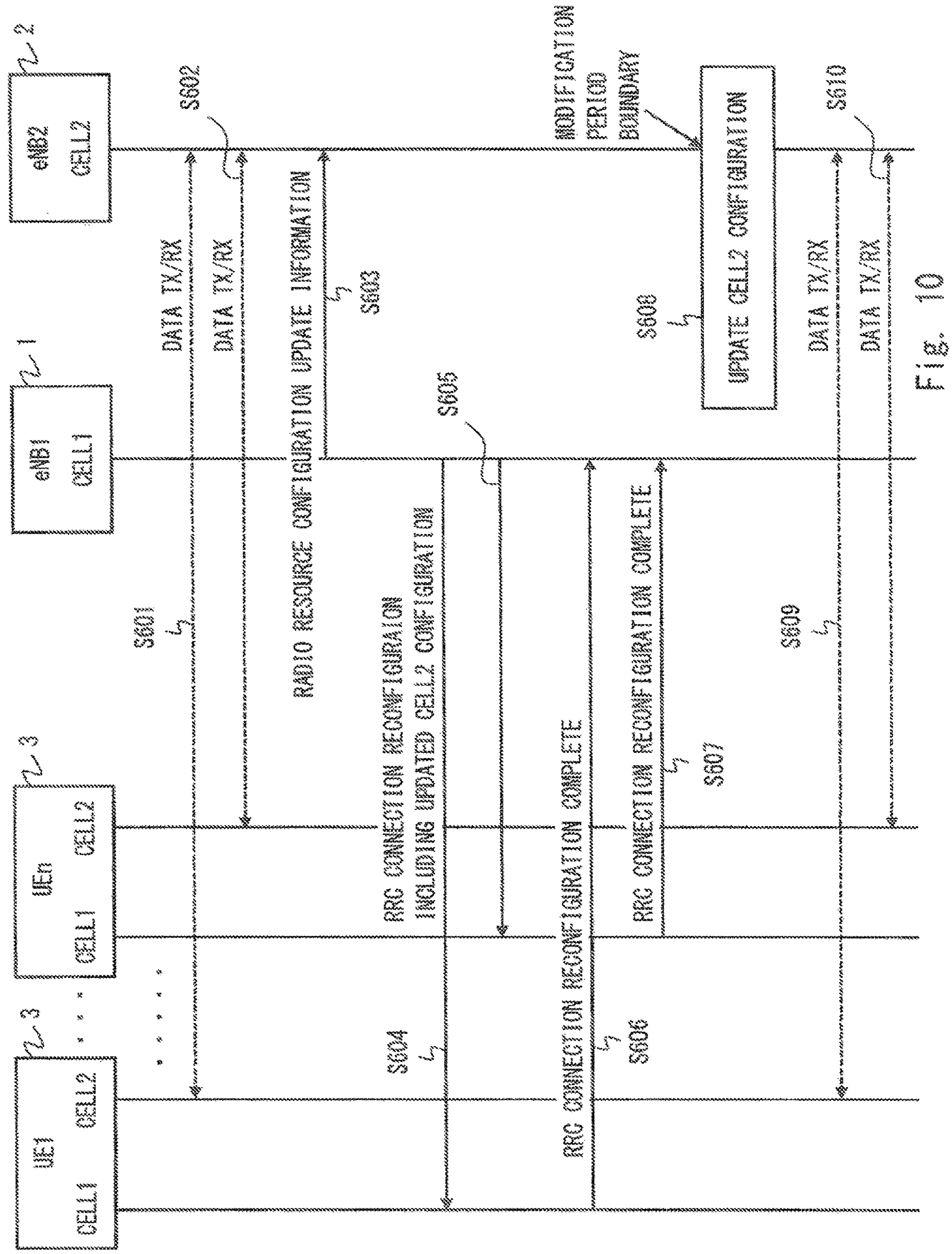
FIG. 10 is a sequence diagram showing an example of a communication control method in a radio communication system according to the second embodiment (Procedure Example 6)
Figure 11:
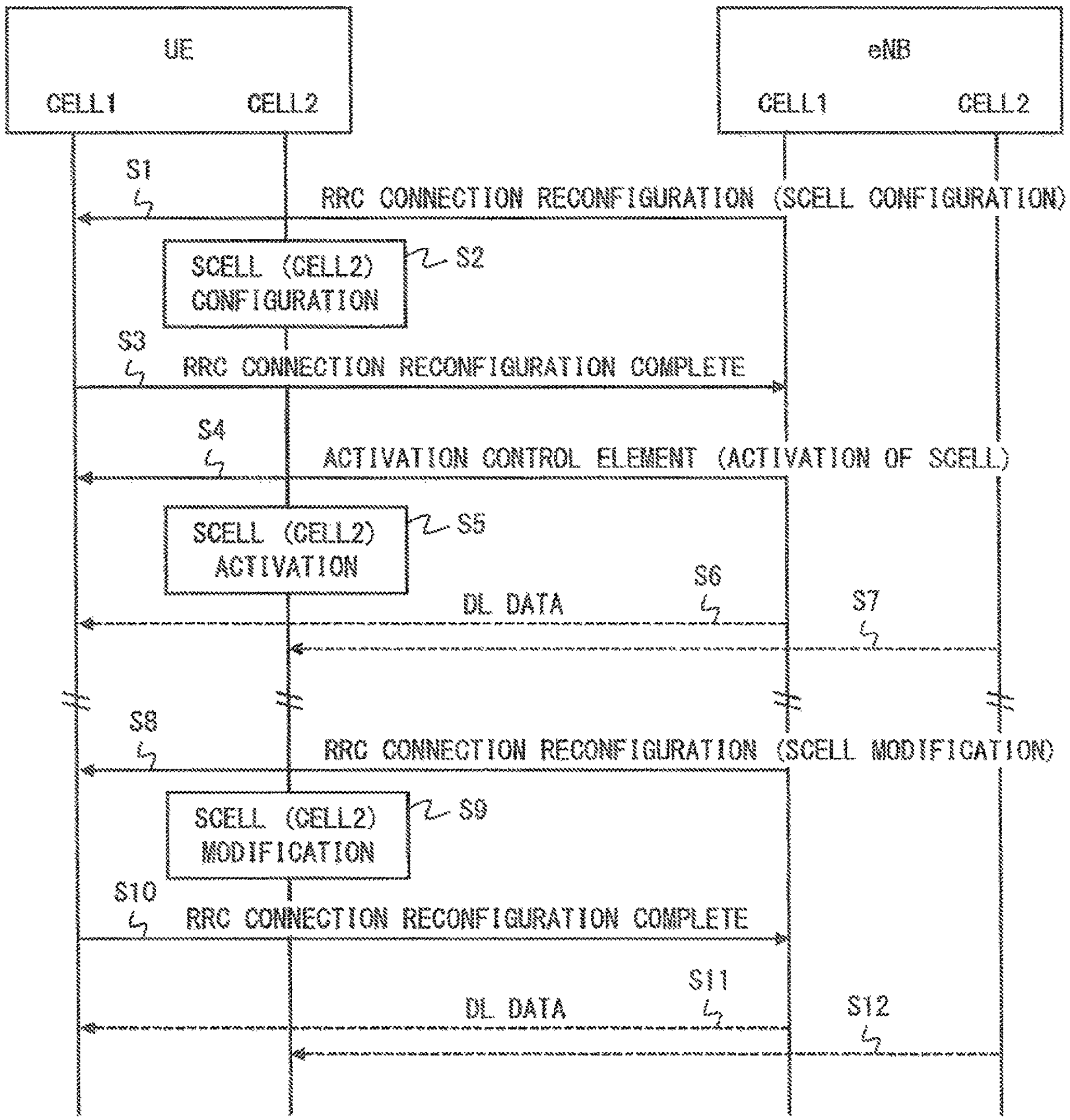
FIG. 11 is a sequence diagram showing a procedure for changing a radio resource configuration in carrier aggregation according to the LTE (Background Art).

FIG. 10 shows an example of a sequence diagram showing the Procedure Example 6. Note that in FIG. 10, the first cell 10 (i.e., the PCell) and the second cell 20 (i.e., the SCell) are expressed as "CELL1" and "CELL2", respectively. Further, FIG. 10 also shows n number of UEs 3 (UE1, . . . , UEn in FIG. 10) that communicate with the eNB 2 in the CELL2.

In steps S601 and S602, the eNB 2 transmits and/or receives data to and/or from the n number of UEs 3 in the CELL2. In a step S603, the eNB 1 determines that the system information, which is the configuration related to the radio resource control for the CELL2 (SCell), needs to be changed, and hence transmits to the eNB 2 an advance notification of the update to the system information of the CELL2 and the contents of the system information to be updated (e.g., a radio parameter).

In steps S604 and S605, the eNB 1 transmits configuration information related to the radio resource control for the CELL2 (i.e., information such as a radio parameter or the like included in the system information in the Procedure Example 6) to the n number of UEs 3 (UE1, . . . , UEn in FIG. 10) that are using the CELL 2 in addition to the CELL1 (RRC Connection Reconfiguration including updated CELL2 configuration). In steps S606 and S607, the n number of UEs 3 update the configuration related to the radio resource control for the CELL2 according to the received configuration information and report the completion of that update to the eNB 1 (RRC Connection Reconfiguration Complete). Each UE 3 may refrain from transmitting and receiving signals (e.g., data) in the CELL2 while the UE 3 is updating the configuration related to the radio resource control for the CELL2.

In a step S608, at a timing for updating the system information of the CELL2 (Modification period boundary) comes, the eNB 2 updates the system information based on the updated contents (such as a radio parameter) of the system information received from the eNB 1 (Update CELL2 configuration).

In steps S609 and S610, the eNB 2 resumes or starts data transmission and/or reception to and/or from the n number of UEs 3 in the CELL2. As described above, the eNB 2 does not transmit and receive data to and from the UEs 3 while the configurations related to the radio resource control for the CELL2 (SCell) are being changed in the respective UEs 3. Accordingly, data transmission in the SCell is appropriately performed and packet losses and the like can be prevented.

Modification of Procedure Example 6

The eNB 1 may transmit the configuration information, which is related to the radio resource control for the n number of UEs 3 in the CELL2, in the CELL1 at the same timing as the update timing of the system information in the eNB 2 (CELL2), or may transmit the configuration information in the CELL1 immediately after that update timing.

The eNB 1 may transmit the configuration information, which is related to the radio resource control for the n number of UE 3 in the CELL2, to a predetermined UE group including one or more UEs (i.e., on a group-by-group basis) by using a common message. Alternatively, the eNB 1 may transmit the configuration information, related to the radio resource control for the CELL2, to all the UEs 3 located in the CELL1 by using a common message. Further, alternatively, the eNB 1 may transmit the configuration information, related to the radio resource control for the CELL2, to the UEs 3 that use both the CELL1 and the CELL2 by using a common message. In this way, the amount of the use of radio resources in the CELL1 necessary for transmitting the configuration information related to the radio resource control for the CELL2 can be reduced.

In the case where the eNB 1 transmits a common message to a plurality of UEs 3, each of the UEs 3 that have received the configuration information related to the radio resource control by that common message, i.e., each of the UEs 3 that have been instructed to update the configuration related to the radio resource control, may report the completion of the update to the configuration to the eNB 1 by using a predetermined common response message.

The eNB 1 may notify the n number of UEs 3 that the configuration related to the radio resource control for the CELL2 (the system information in this example) is to be updated (e.g., by using paging), instead of transmitting the configuration information related to the radio resource control for the CELL2 to the n number of UEs 3 in the CELL 1. In this case, in response to receiving the notification (e.g., paging) from the eNB 1, the n number of UEs 3 may voluntarily receive the system information in the CELL2 at or immediately after the update timing of the system information. Each UE 3 may refrain from transmitting and receiving data in the CELL2 until it properly receive the updated system information.

Other Embodiments

In the first and second embodiments, the radio station 1 may transmit, to the radio station 2 through a core network (e.g., an EPC), the update information regarding the update to the configuration related to the radio resource control.

In the first and second embodiments, examples in which the radio terminals (UE) are individually controlled are mainly explained. However, for example, the configuration related to the radio resource control may be used in common for a plurality of radio terminals (UEs), or may be used in common for all the radio terminals (UEs) located in the same cell. Accordingly, with regard to the notification method of the configuration information related to the radio resource control, the configuration information may be transmitted to a plurality of radio terminals (UEs) by using a common message, or may be transmitted to all the radio terminals (UEs) located in the same cell by using a common message (e.g., by using system information).

The first and second embodiments can be applied to a case where the first radio station 1 (eNB 1) is a macro radio base station (Macro eNB (MeNB)) that serves (manages) a macro cell having a relatively large coverage and the second radio station 2 (eNB 2) is a low-power radio base station (Low Power Node (LPN)) that serves (manages) a cell having a small coverage. Examples of a LPN include a pico-radio base station (Pico eNB: PeNB) having functions similar to those of the MeNB and a new type of network node (New Node) having fewer functions than those of the MeNB. Further, the second cell 20 may be a new type of cell (New Cell Type) which is different from conventional cells and uses a new type of carrier (New Carrier Type) different from conventional carriers.

Each of the communication control methods performed by the radio station 1 (communication control unit 15), the radio station 2 (communication control unit 25), and the radio terminal 3 (communication control unit 35) described in the first and second embodiments may be implemented by using a semiconductor processing device such as an Application Specific Integrated Circuit (ASIC). Alternatively, these methods may be implemented by causing a computer system including at least one processor (e.g., Microprocessor, Micro Processing Unit (MPU), or Digital Signal Processor (DSP)) to execute a program. Specifically, one or more programs including instructions for causing a computer system to perform algorithms shown in the flowcharts and the sequence diagrams may be created, and these programs may be supplied to a computer.

These programs can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, these programs can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

In the first and second embodiments, an LTE system has been mainly explained. However, these embodiments may be applied to radio communication systems other than the LTE system, such as a 3GPP Universal Mobile Telecommunications System (UMTS), a 3GPP2 CDMA2000 system (1×RTT, High Rate Packet Data (HRPD)), a Global System for Mobile Communications (GSM) system, and a WiMAX system.

Further, the above-described embodiments are merely examples for the application of the technical ideas obtained by the present inventors. Needless to say, these technical ideas are not limited to the above-described embodiments and various modifications can be made thereto.

This application is based upon and claims the benefit of priority from Japanese patent applications No. 2013-033704, filed on Feb. 22, 2013, the disclosure of which is incorporated herein in its entirety by reference.

REFERENCE SIGNS LIST

1 FIRST RADIO STATION
2 SECOND RADIO STATION
3 RADIO TERMINAL
10 FIRST CELL
20 SECOND CELL
15 COMMUNICATION CONTROL UNIT
25 COMMUNICATION CONTROL UNIT
35 COMMUNICATION CONTROL UNIT

The invention claimed is:

1. A method performed by a master base station which operates a first cell, comprising:

configuring Dual Connectivity for a radio terminal, in which the radio terminal is connected to the master base station operating the first cell and is connected to a secondary base station operation a second cell; and while the radio terminal is connected to the secondary base station in Dual Connectivity:

transmitting, to the secondary base station, information for modifying resource configuration of the second cell; and after the transmitting the information for modifying the resource configuration of the second cell, transmitting, to the radio terminal via the secondary base station, configuration information of the second cell, wherein the configuration information of the second cell is different from the information for modifying the resource configuration of the second cell, and wherein the configuration information of the second cell includes a terminal measurement configuration (MeasConfig).

2. A master base station configuration to operate a first cell, comprising:

a memory; and at least one processor configured to access the memory and configured to:

configure Dual Connectivity, for a radio terminal, in which the radio terminal is connected to the master base station operating the first cell and is connected to a secondary base station operating a second cell; and while the radio terminal is connected to the secondary base station in Dual Connectivity:

transmit, to the secondary base station, information for modifying resource configuration of the second cell; and after transmission of the information for modifying the resource configuration of the second cell, transmit, to the radio terminal via the secondary base station, configuration information of the second cell, wherein the configuration information of the second cell is different from the information for modifying the resource configuration of the second cell, and wherein the configuration information of the second cell includes a terminal measurement configuration (MeasConfig).

3. A method performed by a communication terminal, comprising:

operating Dual Connectivity in which the communication terminal is connected to a master base station operating a first cell and is connected to a secondary base station operating a second cell; and while the communication terminal is connected to the secondary base station in Dual Connectivity:

receiving, from the master base station via the secondary base station, configuration information of the second cell, wherein the configuration information of the second cell is different from information for modifying the resource configuration of the second cell transmitted from the master base station to the secondary base station, and wherein the configuration information of the second cell includes a terminal measurement configuration (MeasConfig).

4. A communication terminal comprising:

a memory; and at least one processor configured to access the memory and configured to:

operate Dual Connectivity in which the communication terminal is connected to a master base station operating a first cell and is connected to a secondary base station operating a second cell; and while the communication terminal is connected to the secondary base station in Dual Connectivity:

receive, from the master base station via the secondary base station, configuration information of the second cell, wherein the configuration information of the second cell is different from information for modifying the resource configuration of the second cell transmitted from the master base station to the secondary base station, and wherein the configuration information of the second cell includes a terminal measurement configuration (MeasConfig).

5. A method performed by a secondary base station which operates a second cell, comprising:

configuring Dual Connectivity, for a radio terminal, in which the radio terminal is connected to a master base station operating a first cell and is connected to the secondary base station operating the second cell; and while the radio terminal is connected to the secondary base station in Dual Connectivity:

receiving, from the master base station, information for modifying resource configuration of the second cell;

after receipt of the information for modifying the resource configuration of the second cell, receiving configuration information of the second cell from the master base station; and forwarding, to the radio terminal, the configuration information of the second cell, wherein the configuration information of the second cell is different from the information for modifying the resource configuration of the second cell, and wherein the configuration information of the second cell includes a terminal measurement configuration (MeasConfig).

6. A secondary base station configured to operate a second cell, comprising:

a memory; and at least one processor configured to access the memory and configured to:

configure Dual Connectivity for a radio terminal; in which the radio terminal is connected to a master base station operating a first cell and is connected to the secondary base station operating the second cell; and while the radio terminal is connected to the secondary base station in Dual Connectivity:

receive, from the master base station, information for modifying resource configuration of the second cell;

after receipt of the information for modifying the resource configuration of the second cell, receive configuration information of the second cell from the master base stations; and forward, to the radio terminal, the configuration information of the second cell, wherein the configuration information of the second cell is different from the information for modifying the resource configuration of the second cell, and wherein the configuration information of the second cell includes a terminal measurement configuration (MeasConfig).

* * * * *